(12) United States Patent
Ta et al.

(10) Patent No.: US 12,112,352 B2
(45) Date of Patent: *Oct. 8, 2024

(54) SYSTEM AND METHOD FOR MONITORING MOBILE MEDIA

(71) Applicant: Productive Application Solutions, Inc., Sheridan, WY (US)

(72) Inventors: Peter Ta, Tucson, AZ (US); Gerald Maliszewski, San Diego, CA (US)

(73) Assignee: Productive Application Solutions, Inc., Sheridan, WY (US)

( * ) Notice: Subject to any disclaimer, the term of this patent is extended or adjusted under 35 U.S.C. 154(b) by 856 days.

This patent is subject to a terminal disclaimer.

(21) Appl. No.: 17/201,419

(22) Filed: Mar. 15, 2021

(65) Prior Publication Data
US 2021/0201356 A1    Jul. 1, 2021

Related U.S. Application Data

(63) Continuation-in-part of application No. 17/179,574, filed on Feb. 19, 2021, now Pat. No. 11,257,120, (Continued)

(51) Int. Cl.
*G06Q 30/00* (2023.01)
*G06Q 30/0242* (2023.01)
*G06Q 30/0251* (2023.01)

(52) U.S. Cl.
CPC ..... *G06Q 30/0266* (2013.01); *G06Q 30/0244* (2013.01); *G06Q 30/0252* (2013.01); *G06Q 30/0267* (2013.01)

(58) Field of Classification Search
CPC .......... G06Q 30/0244; G06Q 30/0252; G06Q 30/0267
(Continued)

(56) References Cited

U.S. PATENT DOCUMENTS 4,259,660 A * 3/1981 Oliver ................. B60Q 1/2611
  116/40
4,764,998 A   8/1988 Norris et al.
(Continued)

FOREIGN PATENT DOCUMENTS

FR    2578996 A  *  9/1986    ........... G07B 13/045
FR    2578996 A1 *  9/1986    ............. G09F 21/04
(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Office of Gerald Maliszewski; Gerald Maliszewski

(57) ABSTRACT

A public exposure monitored media projection system is presented made up of a media projection subsystem that is configured for attachment to a mobile platform, and which may be selectively enabled. A monitoring subsystem measures public exposure to projected media and supplies exposure measurements. A communications subsystem accepts verification information including media projection subsystem enablement and the exposure measurements. A handicap subsystem offsets the media value associated with the enablement of the media projection subsystem, which is calculated in response to the exposure measurements. Typically, a rewards subsystem provides a reward to an entity (e.g., the media projection subsystem (MPS) owner) in response to the media value offset by the exposure measurement. The system may also include a publically accessible access point, a location subsystem, and a targeting subsys- (Continued)

tem for selecting a media projection subsystem target geographic location.

26 Claims, 15 Drawing Sheets

Related U.S. Application Data which is a continuation-in-part of application No. 17/168,313, filed on Feb. 5, 2021, which is a continuation-in-part of application No. 17/133,722, filed on Dec. 24, 2020, now Pat. No. 11,055,743, which is a continuation-in-part of application No. 17/097,256, filed on Nov. 13, 2020, now Pat. No. 11,887,163, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation-in-part of application No. 17/007,575, filed on Aug. 31, 2020, now Pat. No. 11,468,477, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(58) Field of Classification Search
USPC .......... 705/14.63, 14.62, 14.49, 14.4; 725/32
See application file for complete search history.

(56) References Cited

U.S. PATENT DOCUMENTS

| | | | |
|---|---|---|---|
| 5,086,988 A | 2/1992 | LaPoint et al. | |
| 5,855,406 A | 1/1999 | Vargo | |
| 5,878,516 A * | 3/1999 | Amirian | G09F 21/04 40/591 |
| 5,974,711 A * | 11/1999 | Tipke | G09F 21/04 362/503 |
| 6,017,078 A | 1/2000 | Stagner | |
| 6,247,257 B1 * | 6/2001 | Powell | G09F 21/04 280/507 |
| 6,412,202 B1 * | 7/2002 | Oswood | G09F 21/04 40/204 |
| 6,918,200 B2 * | 7/2005 | Pena | G09F 21/02 40/591 |
| 6,971,070 B2 * | 11/2005 | Obradovich | B60W 50/14 715/835 |
| 7,347,017 B2 * | 3/2008 | Shaffer, Jr. | G09F 21/04 296/21 |
| 7,463,898 B2 | 12/2008 | Bayne | |
| 7,774,966 B2 * | 8/2010 | Rosa | G09F 21/048 40/590 |
| 7,882,653 B2 * | 2/2011 | Barlow | G06Q 30/0275 40/606.15 |
| 8,010,134 B2 | 8/2011 | Barnes et al. | |
| 8,418,386 B1 * | 4/2013 | Key | G09F 21/048 40/590 |
| 8,712,630 B2 | 4/2014 | Walwer | |
| 9,076,336 B2 * | 7/2015 | Tippelhofer | G08G 1/148 |
| 9,183,572 B2 * | 11/2015 | Brubaker | G06Q 30/02 |
| 9,939,287 B2 * | 4/2018 | Castellucci | G01C 21/3476 |
| 10,382,579 B2 * | 8/2019 | Mevissen | H04L 67/306 |
| 10,482,766 B2 * | 11/2019 | Mowatt | G08G 1/144 |
| 10,733,891 B2 * | 8/2020 | Chow | G08G 1/04 |
| 2002/0009978 A1 * | 1/2002 | Dukach | G08G 1/01 455/99 |
| 2006/0129451 A1 * | 6/2006 | Kohanim | G06Q 30/02 705/14.58 |
| 2006/0265922 A1 * | 11/2006 | Shaffer, Jr. | G09F 21/048 40/591 |
| 2008/0227467 A1 * | 9/2008 | Barnes | H04W 4/02 455/456.2 |
| 2009/0084009 A1 * | 4/2009 | Vandergriff | G09F 13/18 40/546 |
| 2009/0299857 A1 * | 12/2009 | Brubaker | G06Q 30/02 455/99 |
| 2011/0131235 A1 * | 6/2011 | Petrou | G06F 16/532 707/769 |
| 2012/0245966 A1 * | 9/2012 | Volz | G06Q 10/02 705/5 |
| 2013/0304565 A1 * | 11/2013 | Saccoman | G06Q 30/0242 705/14.41 |
| 2013/0307706 A1 * | 11/2013 | Kriezman | B60Q 1/503 340/988 |
| 2014/0214319 A1 * | 7/2014 | Vucetic | G01C 21/3446 701/533 |
| 2014/0274106 A1 * | 9/2014 | Kim | H04W 24/02 455/454 |
| 2014/0309865 A1 * | 10/2014 | Ricci | G06F 16/583 701/36 |
| 2015/0123818 A1 * | 5/2015 | Sellschopp | G08G 1/096816 340/932.2 |
| 2015/0254721 A1 * | 9/2015 | Rad | G06Q 30/0266 705/14.63 |
| 2015/0279210 A1 * | 10/2015 | Zafiroglu | G08G 1/065 340/932.2 |
| 2016/0116293 A1 * | 4/2016 | Grover | G01C 21/34 701/23 |
| 2016/0191879 A1 * | 6/2016 | Howard | H04N 9/3147 348/745 |
| 2016/0267539 A1 * | 9/2016 | Saah | H04W 4/80 |
| 2017/0309170 A1 * | 10/2017 | Wang | G08G 1/146 |
| 2018/0186309 A1 * | 7/2018 | Batten | B60Q 1/56 |
| 2018/0186311 A1 * | 7/2018 | Mason | B60R 21/01 |
| 2019/0121522 A1 * | 4/2019 | Davis | G06F 3/04815 |
| 2019/0135180 A1 * | 5/2019 | Watatsu | B60R 1/001 |
| 2021/0001724 A1 * | 1/2021 | Dobashi | B60K 35/00 |

FOREIGN PATENT DOCUMENTS

| | | | | |
|---|---|---|---|---|
| GB | 2402254 | | 11/2002 | |
| GB | 2402254 A * | | 12/2004 | G06Q 20/127 |
| JP | 2010026474 A * | | 2/2010 | G09F 21/048 |
| JP | 2018072077 | | 5/2018 | |
| JP | 2018072077 A * | | 5/2018 | G01S 19/14 |
| JP | 2018205399 A * | | 12/2018 | G09F 21/04 |
| WO | WO-0145065 A2 * | | 6/2001 | G06Q 30/02 |
| WO | WO 2008/135617 | | 11/2008 | |
| WO | WO-2008135617 A1 * | | 11/2008 | G08G 1/0175 |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*

Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*

Florian Alt. A Design Space for Pervasive Advertising on Public Displays. (Dec. 17, 2012). Retrieved online Aug. 13, 2020. https://pdfs.semanticscholar.org/4bef/aba88eb1d14e81dcd610658bccbbf287b770.pdf (Year: 2012).*

Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*

Technoframe. LED Bus Screens. (Nov. 18, 2011). Retrieved online Aug. 13, 2020. https://technoframe.com/led-bus-screens (Year: 2011).*

Livedesign. Art on the MART: World's Largest Permanent Projection Mapping System. (Nov. 29, 2018). Retrieved online Oct. 23,

(56) References Cited

OTHER PUBLICATIONS 2021. https://www.livedesignonline.com/excellence-installation-awards/art-themart-world-s-largest-permanent-projection-mapping-system (Year: 2018).*
Morris et al., A Comprehensive System for Assessing Truck Parking Availability, U of Minn, Jan. 2017.
Liu et al., An Intelligent Indoor Location-based Smartphone parking Service, MPDI, Oct. 2012.
Kulesza, Mateusz, E-Parking: Automated-Ticketing Parking Meter System, Harvard Library, Apr. 2015.
Asku, Hidayet, "Advertising in the IoT Erra: Vision and Challenges", IEEE Communications, Jan. 31, 2018.
Parker, Phillip, "The 2018-2023 World Outlook for Outdoor Advertising", 2017 ICON Group International.

* cited by examiner

SYSTEM AND METHOD FOR MONITORING MOBILE MEDIA

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to mobile media presentations and, more particularly, to systems and methods monitoring the effectiveness of mobile media presentations and directing mobile media subsystems to vacant parking locations.

2. Description of the Related Art

Market research shows that outdoor billboard marketing space has increasingly become harder to find and, hence, more valuable. At the same time, automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, addresses to problem of finding more outdoor advertising space by providing an automotive targeted parking system that adds to an automobile the additional feature of a media display subsystem, and which may also include a Wireless Local Area Network (WLAN) IEEE 802.11 (WiFi) access point (hotspot).

While the above-described system addresses the provision of additional outdoor advertising through the "gig economy" use of automobiles, the act of parking remains a potential issue. Parking in many desirable advertising locations in metropolitan areas is often limited to one or two hours only. Further, the desirability of some advertising locations changes throughout the course of a day. Thus, the necessity of frequency changing parking spots can become a burden and may make the use of their automobile as a mobile media center impractical for some owners.

Another issue is that even if parked in a generally desirable area, a particular parking spot may have limited visibility. In this situation it would be desirable to adjust the charges to advertising clients based on the visibility of the particular location.

It would be advantageous if the exposure of an automobile, used as portable real estate to projecting media and act as a communications center, could be measured.

It would be advantageous if the above-mention automobile media center could be efficiently directed to vacant parking spots throughout the course of a day.

SUMMARY OF THE INVENTION

A system and method are disclosed herein for automotive vehicle positioning, for use in providing a media subsystem including a media projection subsystem and/or a publically accessible access point, such as a Wireless Local Area Network (WLAN) IEEE 802.11 (e.g., WiFi) and Wireless Personal Area Network (WPAN) (e.g., Bluetooth) access points. Advantageously, the vehicles can be moved by the vehicle owner or third parties, e.g., advertisers providing the media, or by either party if the vehicle can be autonomously driven. Further, once the vehicle is parked, the efficacy of the projected media and/or AP communications can be measured. Thus, the system may act as a mobile advertising platform that seeks to expand and capture market share within the outdoor advertising market segment by directing the selective deployment of media and WLAN/WPAN services to preferred target locations. The system may transmit the following information: (i) a unique identifier for the device in use (for example, radio-frequency identification), (ii) the time, date, duration, and location (using global positioning satellite (GPS) or cellular triangulation systems), (iii) an indication that the media projection subsystem has been deployed, and (iv) an indication that the WLAN/WPAN access point is in use. Graphic information system (GIS) mapping technology may be used to compensate a person or business entity associated with the system for operating in specified locations. One of the primary features of the system its ability to predict vacant parking locations and to determine if a vehicle is temporarily parked in a stationary location.

Accordingly, a public exposure monitored media projection system is presented made up of a media projection subsystem that is configured for attachment to a mobile platform, and which may be selectively enabled. Some examples of a media projection subsystem include an image projector, a retractable screen deployed over an exterior surface of the mobile platform, a liquid crystal display, holographic display, a light emitting diode display, a media topper, popup, wallscape, switchable glass displays, or combinations thereof. A monitoring subsystem, typically configured for attachment to the media projection subsystem, has an interface to measure public exposure to projected media and an output to supply exposure measurements. A communications subsystem, configured for attachment to the media projection subsystem, has an interface to accept verification information including media projection subsystem enablement and the exposure measurements. A handicap subsystem has an output offsetting the media value associated with the enablement of the media projection subsystem, which is calculated in response to the exposure measurements. Typically, a rewards subsystem provides a reward to an entity (e.g., the media projection subsystem (MPS) owner or the owner of a mobile platform on which the MPS is situated) in response to the media value offset by the exposure measurement.

The system may also include the following components, including a location subsystem, configured for attachment to the media projection subsystem, having an output to supply a geographic location of the media projection subsystem. A targeting subsystem is used for selecting a media projection subsystem target geographic location from a plurality of potential target geographic locations having corresponding location values. In this case, the communications subsystem receives verification information including a selected target geographic location. The rewards subsystem may provide a reward to an entity in response to a combination of the offset media value and the location value. The handicap subsystem may also modify the calculation of the media value offset in response to the selected geographic location. For example, exposure impediments may be more critical in some geographic locations.

In one aspect, the communications subsystem may wirelessly transmit the exposure measurement to a central controller server, which may be configured to enable the targeting, rewards, and handicap subsystems. Alternatively, the communications subsystem store the exposure measurements locally, in which case the media projection subsystem may be configured to enable the targeting, rewards, and handicap subsystems.

The monitoring subsystem may include components such as a camera, sonar, LIDAR, a photodetector ranging subsystem, and combinations thereof. One method of measuring exposure uses a facial direction detection subsystem to accept images from the camera, select faces from camera images, and measure the duration of time the faces are directed to the media projection subsystem. In another aspect, the camera can be mounted on an airborne vehicle such as a drone. The exposure measurement may also be based on an actual media projection subsystem viewing angle (as compared to a maximum viewing angle, where the actual view is the view from which the media projection can be realistically seen as a result of impediments such as view blocking structures, weather conditions, ambient light, sunlight angle, and the speed of passing traffic.

In one aspect, the system includes a publically accessible access point (AP), configured for attachment to the mobile platform, which may a WLAN device, WPAN device, or both. In this case, a communication gauge has an output to supply a measurement of communication statistics, and the handicap subsystem modifies a communication value associated with the AP in response to the communication statistics. As above, a rewards subsystem provides a reward to an entity in response to the communication value offset by the communication statistics. In some aspects, the system includes the AP without the media projection subsystem being required.

A system is also provided for directing mobile media platforms to predicted vacant parking locations. The system includes a media subsystem, configured for attachment to a mobile platform, which may incorporate a media projection subsystem, a publically accessible access point, or both, as described above. A location subsystem determines a geographic location of the mobile platform and a parking vacancy subsystem supplies predicted vacant parking locations. A wireless communications subsystem has an interface to receive verification information including the mobile platform geographic location and to receive predicted vacant parking locations. The system may include a targeting subsystem for selecting a media subsystem target geographic location from a plurality of potential value weighted target geographic locations, in which case the parking vacancy subsystem supplies a predicted vacant parking location in the selected target geographic location. In some aspects the targeting subsystem provides a reward to an entity in response to the weighted value of the selected target geographic location.

In another aspect, the parking vacancy subsystem receives a request from a first media subsystem for a predicted parking vacancy in a first geographic region. The system further includes a vacancy holding mobile platform with a location subsystem to determine a geographic location of the vacancy holding mobile platform, as well as a wireless communications subsystem having an interface to transmit that it has occupied a parking location in the first geographic region, and to receive instructions for surrendering the occupied parking location to the first media subsystem. The vacancy holding mobile platform may be either a ground-based vehicle or an airborne vehicle.

Also provided is a system for the measurement of display presentation efficacy. The system includes a media projection subsystem as described above. A camera records images of human beings interacting with media projected by the media projection subsystem. A facial direction detection subsystem accepts images from the camera, recognizes faces from camera images, and supplies a measurement of the duration of time the faces are directed to the media projection subsystem. An efficacy monitoring subsystem accepts the duration of time measurements and supplies a determination of media effectiveness in response to the duration time measurements.

Additional details of the above-described systems are provided below.

DETAILED DESCRIPTION

Figure 1A:
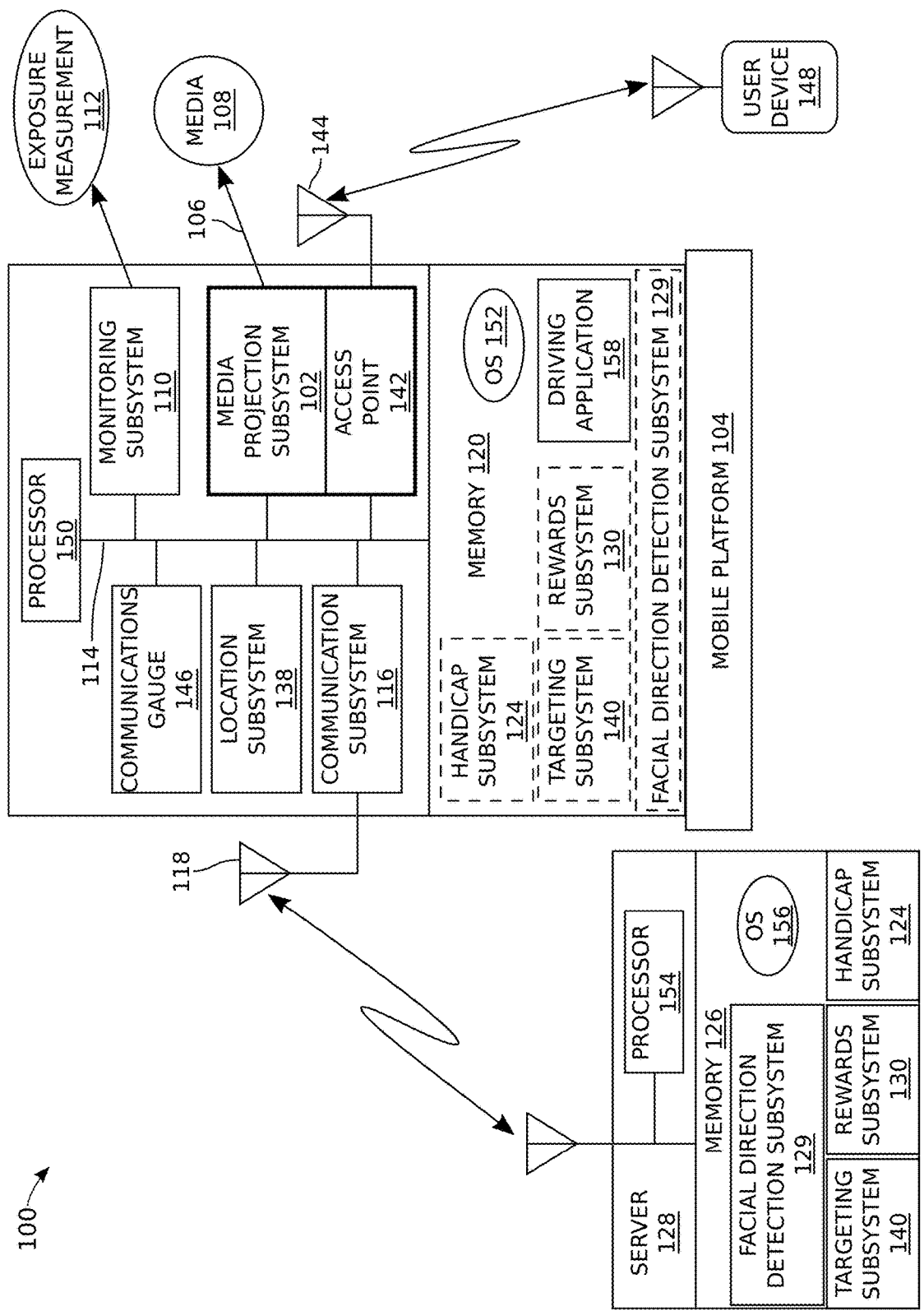
FIGS. 1A through 1D are diagrams depicting a public exposure monitored media projection system.

FIGS. 1A through 1D are diagrams depicting a public exposure monitored media projection system. The system 100 comprises a media projection subsystem 102, which may be selectively engaged, and configured for attachment to a mobile platform 104. Alternatively, the system may be understood to comprise a chassis, with the media projection subsystem embedded in the chassis. The media projection subsystem 102 has an interface, represented by reference designator 106, to project a form of visual media 108. Some examples of the media projection subsystem 102 include an image projector, a retractable screen deployed over an exterior surface of the mobile platform, or a liquid crystal display (LCD) or light emitted diode (LED) TV monitor type display, a media topper, a popup, a wallscape, holographic display, switchable glass displays (such as made by Gauzy), and combinations thereof. For example, a screen deployment mechanism may wrap and unwrap a flexible screen material around a roller. The system 100 is not limited to any particular type of screen material or deployment means. A viewing screen may be selectively deployable by the screen deployment mechanism when the mobile platform 104 is parked in a stationary geographic location. Typically, a flexible viewing screen cannot safely be deployed unless the mobile platform is stationary. The media projection subsystem 102 may be selectively engageable to project an image onto the deployed viewing screen. The media projection subsystem 102 may also broadcast audio messages.

The media projection subsystem 102 may be configured for attachment to the roof of an automotive vehicle 104, and a viewing screen may be deployed over an exterior surface (e.g., door) of the automotive vehicle 104. However, it should be understood that the viewing screen may, alternatively, be deployed over other exterior surfaces (e.g., front or back). Although not shown in these views, the system 100 may include two media projection subsystems with screens overlying driver and passenger side doors. However, the system is not limited to any particular number of media projection subsystems. The media projection subsystem 102 may be a popup that extends vertically up from a substantially planar horizontal roof. Alternatively, an imaging projector may project images on both sides of the popup viewing screen, or more than one chassis/viewing screen/imaging projector subsystem may be attached to the roof.

The media projection subsystem 102 may be an image projector enabled as a liquid crystal (LC) or LED display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. The media projection subsystem 102 may also be an LCD or LED TV monitor type display, persistent image fan, or an electroluminescent (EL) display. In other words, the media projection subsystem 102 may be a 2-dimensional or 3-dimensional image, which may or may not be transitory. Transitory images include a series of still images, videos, or combinations thereof. In the one aspect, for example in the case of a popup, at least some portions of the media being projected may rotate around a vertical z axis.

The media projection subsystem 102 may also include an internal battery and/or cables for attachment to an external power source. The media projection subsystem 102 typically includes miscellaneous electronic circuitry required to support the major components described below, as would well understood in the art. The media projection subsystem 102 may include components for attaching to the mobile platform 104. Some common examples of a ground-based mobile platform include an automotive vehicle, scooter, truck, a towed trailer, or portable objects that a small enough to be moved without wheels, (e.g., a sidewalk sign). The mobile platform 104 may also be an airborne vehicle, such as a drone or unmanned aerial vehicle (UAV), or a water based craft, such as a boat, raft, or jet ski.

A monitoring subsystem 110 has an interface represented by reference designator 112 to measure public exposure to projected media and an output on line 114 to supply exposure measurements. The monitoring subsystem 110 may be enabled through the use of a component such as a camera, sonar, LIDAR, a photodetector ranging subsystem, and combinations thereof. Typically, these components are mounted with media projection subsystem 102 or the mobile platform.

If so enabled, the monitoring subsystem camera may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. Alternatively or in addition, the camera images my act to verify that the media projector subsystem has been enabled, the platform is stationary, or the platform is located in a particular location. In one aspect, simply recording a change in images, and thus proximate traffic, can be used as a means for proving media projector subsystem enablement. As an alternative, or in addition to the camera, the system may further comprise a proximity detector subsystem to sense nearby motion, to measure the density of proximate vehicular or foot traffic, which data is transmitted by the communications subsystem or recorded in local memory.

Figure 1B:
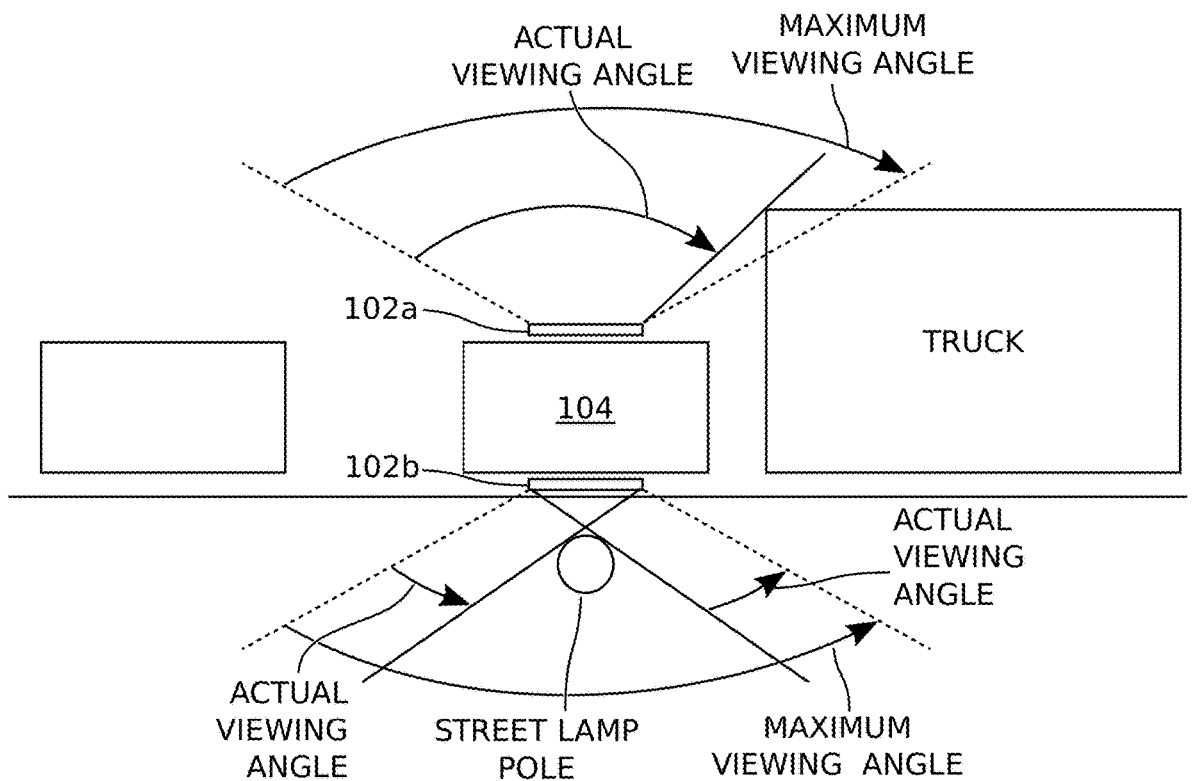

In its simplest form, the monitoring subsystem 110 measures an actual media projection subsystem viewing angle, as shown in FIG. 1B. The dotted lines represent a maximum possible viewing that may be limited by the media image that can be realistically perceived by the human eye or a camera. In the case of an LED or LCD display, the maximum viewing angle has limitations inherent to the technology. The solid lines represent the actual viewing angles. Here, a portion of the viewing angle associated with media projection subsystem 102a is blocked by a truck, and the viewing angle associated with media projection subsystem 102b is blocked by a street lamp pole. In other aspects, the monitoring subsystem 110 may measure exposure degradation due to weather conditions, in which case the monitoring subsystem may include a rain gauge. Other exposure factors may include ambient light, the angle of the sun (making the display hard to read), or traffic. For example, if traffic is stopped with a car blocking the media projection subsystem display, that might be considered an exposure degradation. Further, if traffic is going by faster that a predetermined limit, that might also be considered an exposure degradation. Weather and traffic related data may also be obtained from external monitoring systems, conventional Internet websites, or conventional mobile phone applications.

Returning to FIG. 1A, a communications subsystem 116 is configured for attachment to the media projection subsystem 102, having an interface on line 114 to accept verification information including media projection subsystem enablement and/or the exposure measurements. As shown, the communications subsystem 116 is a wireless transceiver with antenna 118. The most typical examples of a wireless communication subsystem 116 are cellular systems (e.g., Global System for Mobile Communications (GSM), Universal Mobile Telecommunications System (UMTS)-time division duplexing (TDD), Long-Term Evolution (LTE), 4th Generation (4G), or 5th Generation (5G)), and the like. Less typically, the communications subsystem 116 may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (Wi-Bro)). As another alternative, the communication messages may be stored in the system local memory 120 as data 122 and periodically downloaded using a wireless or hardwire connection. The system 100 is not limited to any particular type of communication subsystem.

A handicap subsystem 124 has an output on line 114 offsetting a media value associated with the enablement of the media projection subsystem, calculated in response to the exposure measurements. In other words, each type of media presented by the media projection subsystem 102 need not necessarily have the same value. For example, in the case of an advertisement, some clients may be willing to pay more for the presentation of their media than other clients. Thus, the differences in payment represent differences in nominal media values. Regardless of whether the media values have different nominal values, these media values can be adjusted based upon the quality of the presentation. For example, the media values may be based on a presentation with a maximum viewing angle, and if the monitoring subsystem 110 measures a degradation in viewing angle, the media value can be adjusted downward. In the case of advertising media, an offset in media value may result in reduced cost for the advertising client. As shown, the handicap subsystem 124 is a software application stored in a non-transitory memory 126 of central control server 128 in communication with the wireless communications system 116. The application 124 includes a sequence of processor executable steps for calculating the media value offset. Alternatively, as shown in phantom, the handicap application 124 may be stored in the media projection subsystem non-transitory memory 120. In one aspect, a facial direction detection subsystem 129 has an interface to accept images from the camera, and is able to select faces from camera images and measure the duration of time the faces are directed to the media projection subsystem. This "face-time" measurement is another means of measuring media exposure. The facial direction detection subsystem 129 may be enabled as a software application stored in server memory 126, including processor executable steps for measuring face direction duration. Less likely due to memory and processor constraints, the facial direction detection application may be embedded in local memory 120, as shown in phantom.

Facial recognition systems have become well known in the art. Further, variations on these systems have been used to adjust camera position, to optimize facial recognition, such as described in US 2021/0034843. The detection of facial direction, which is the direction in which a human's eyes are directed, is a substantially simpler task than recognizing facial characteristics that permit an individual to be identified.

In another aspect, the handicap subsystem 124 may modify the calculation of the media value offset in response to the selected geographic location. In other words, the offset calculation may be sliding scale based upon location. Exposure degradation in some geographic locations may be less critical in some regions than in others, and a nominal offset associated with a particular percentage degradation of viewing angle, may be likewise reduced. For example, exposure degradation, and thus media value offset, may be reduced if the media projection subsystem is mounted on a sandwich board mobile platform located on a sidewalk, based upon the assumption that a walking pedestrian will still be exposed to the media for a significant duration of time.

In one aspect, a rewards subsystem 130 provides a reward to an entity in response to the media value, offset by the exposure measurement. As used herein, an "entity" may be a person, a business, a corporation, or any type of social organization or business unit able to claim ownership of, or association with, the identification code, media projection subsystem 102, system 100, mobile platform 104, a central control server 128, or server clients. Typically, the rewards subsystem 130 would be embedded as a software application in server memory 126 because the server 128 is likely to have greater storage and processing capacity, but alternatively, it may be stored in local memory 120, as shown in phantom.

Figure 1C:
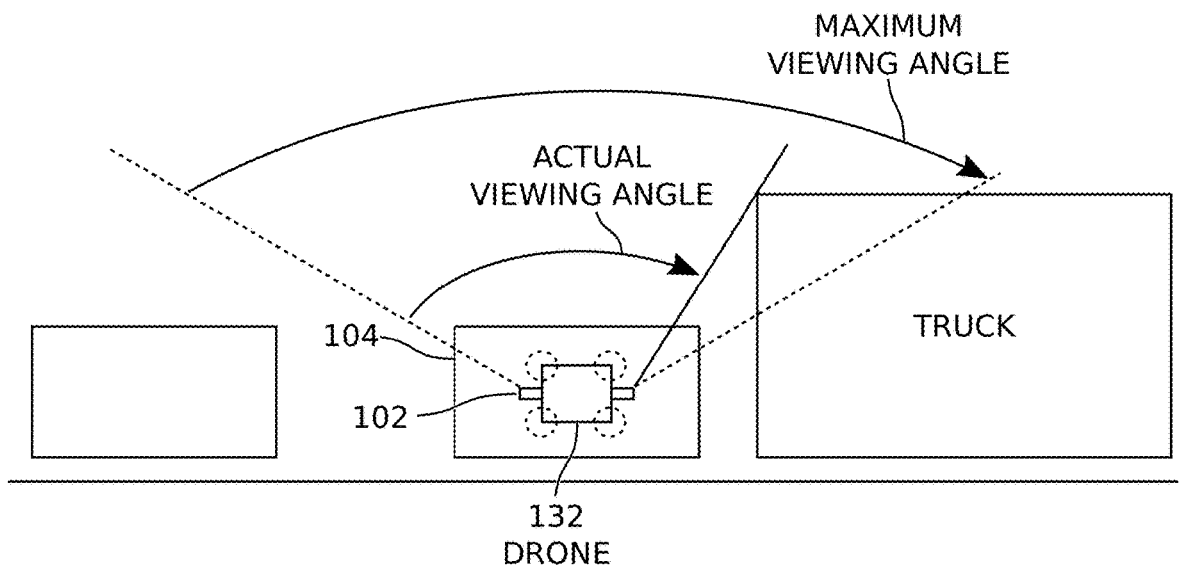
Figure 1D:
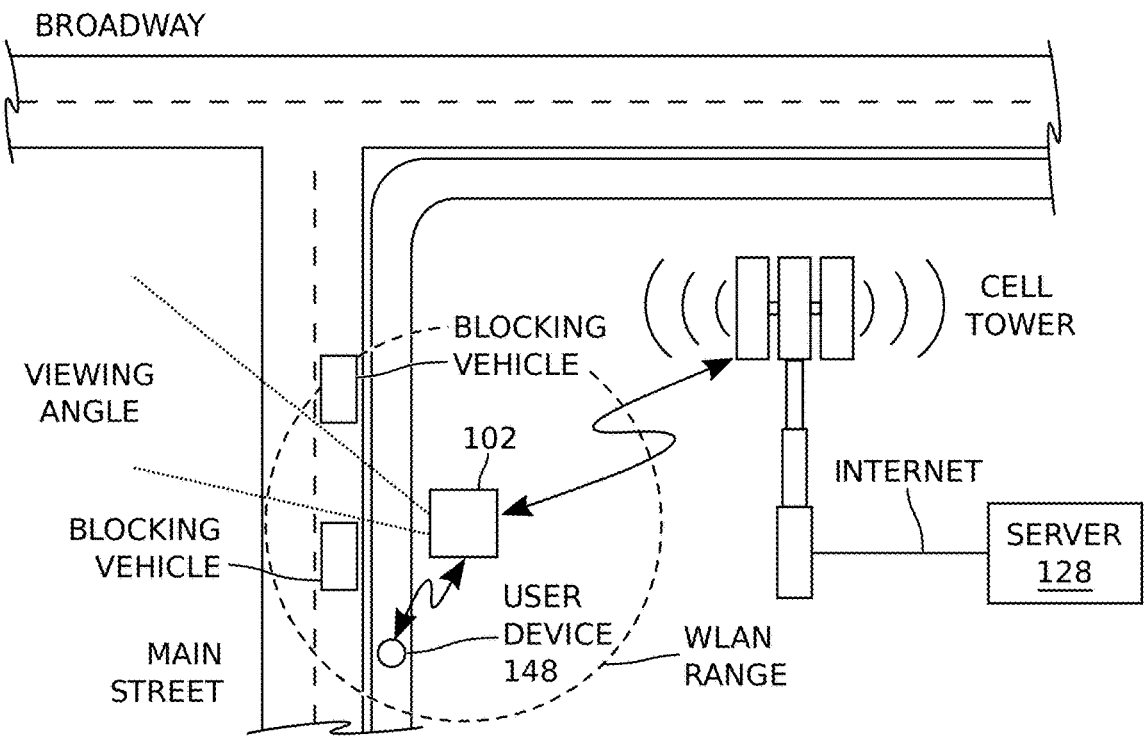

FIG. 1C depicts a drone 132 equipped with a camera, in which case at least a portion of the monitoring subsystem is mounted in the drone aircraft. In this case, the drone 132 further includes a communications subsystem (not shown). In the case of a wireless communications subsystem the exposure measurements can be sent to the media projection subsystem 102 or the server 128. Although the handicap subsystem could be embedded in a drone local memory, more typically it is embedded with the server or the media projection subsystem local memory due to storage and processing concerns. In some aspects the maximum and actual viewing angles measured by the drone must be extrapolated from the drone measurements if the drone cannot be exactly aligned with the media projection subsystem. For example, since the drone 134 is often measuring exposure from a perspective above the media projection subsystem, it may be necessary to correlate the media projection subsystem height with the height of the view blocking truck, and calculate view blockage from the perspective of the media projection substrate display.

Returning to FIG. 1A, in one aspect the system 100 further comprises a location subsystem 138, configured for attachment to the media projection subsystem 102 or mobile platform 104, having an output on line 114 to supply a geographic location of the media projection subsystem. Examples of a location subsystem 138 include a Global Positioning Satellite (GPS) system receiver, assisted GPS taking advantage of cell tower data, a Wireless Local Area Network IEEE 802.11 (WiFi) positioning system, cell-site multilateration, satellite multilateration, inertial system, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796, 340, which is incorporated herein by reference, camera images and the location data of proximate smartphones, laptops, and personal communication devices can also be used to determine location.

A targeting subsystem 140 is used for selecting a media projection subsystem target geographic location from a plurality of potential target geographic locations having corresponding location values. As shown, the targeting subsystem is enabled as software application stored in server memory 126, and includes a sequence of processor executable steps for selecting the target location. The target location can be selected from the media projection subsystem or from the server. Alternatively, the targeting subsystem can be stored in the media projection subsystem local memory 120. The communications subsystem 116 receives verification information including a selected target geographic location and wireless transmits the information of server 128 or stores the information in local memory 120. Thus, in one aspect of the system, the rewards subsystem 130 provides a reward to an entity in response to a combination of the offset media value and the location value.

In another aspect, the system 100 further comprises a publically accessible access point (AP) 142, configured for attachment to the media projection subsystem 102 or mobile platform 104. The AP 142 may be an IEEE 803.11 Wireless Local Area Network (WLAN), such as WiFi, an IEEE 803.15 Wireless Personal Area Network (WPAN), such as Bluetooth, or both WLAN and WPAN, connected to antenna 144. Alternatively, but less common, the access point 142 may an IEEE 802.15.4 Zigbee, WPAN IEEE 802.15 Li-Fi or wireless USB device. Even more unlikely as an access point are Long Range Wireless systems. In the case of the WiFi hotspot being a component of the communications subsystem 116, items 142 and 116 may be collocated. As used herein, a "publically accessible" AP is an AP that can be accessed by the general public without a password or similar security measures. One example of a publically accessible AP is the WiFi hotspot service provided by the typical Starbucks coffee shop. In the case of a password being required for access, the password may be printed on the mobile platform, displayed by the media projection subsystem, or made available through a media projection phone application or website.

In one aspect, the access point 142 can be used to collect data from entities passing by, or engaging with the access point. This data can be stored in local memory 120 for subsequent recovery or transmitted to server 128. A communications gauge 146 has an output on line 114 to supply a measurement of communication statistics, and the handicap subsystem 124 modifies a communication value associated with the AP in response to the communication statistics. A number of ways are known in the art for measuring the effectiveness of radio frequency (RF) communications, which can be used to enable the measurement communication statistics. Some examples include the measurement of bit error rate (BER) and signal strength. The rewards application 130 may provide a reward to an entity in response to the communication value offset by the communication statistics. As above, the reward may be calculated in combination with the value of the target location.

There are two basic links involving the AP 142. One link is between the AP enabled media projection subsystem 102 and the central controller server 128, via communications subsystem 116. This linkage, and thus the communication statistics, should remain relatively consistent as long as the media projection subsystem remains parked in one particular location. The other linkage is between the AP 142 and user devices 148, such as smartphones, laptops, and personal communication devices. These communication statistics are more likely to vary in that users may only be connected to the AP 142 for short periods of time, and the users may be changing their locations while they are connected.

In one aspect, the media projection subsystem 102 further comprises a processor 150 cooperating with software applications in non-transitory local memory 120. The non-transitory memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the system described herein may include both a volatile memory unit and a non-volatile storage device. The memory may be implemented as shared memory and/or distributed memory in a network device.

As is common in many computer systems, processor 150, which may include a peripheral interface, is connected to the bus line 114, to pull operating instructions from operating system (OS) 152 and software applications in memory 120, and manage communications between the various components of system 100. Likewise, server 128 would be enabled through the use of processor 154 and OS 156. For ease of understanding, the above-described functions have been described as individual components. However, it should be understood that in practice, multiple functions may be performed by a single device, subsystem, or software application.

In the case of the media projection subsystem being configured with an autonomously driven mobile platform 104, an autonomous driving application 158 may be stored in the memory 120 and enabled as a sequence of processor executable steps for autonomously driving the mobile platform to a selected mobile platform geographic location destination. More typically, the autonomous driving application would be stored in a separate mobile platform memory (not shown), working in cooperation with the media projection subsystem. As would be understood in the art, a vehicle equipped for autonomous driving might include sensors such as cameras, LIDAR, SONAR, photodector ranging systems, and inertial measurement units (IMUs). Obviously, such an equipped vehicle would include mechanisms for steering, braking, and acceleration. Commercial autonomous self-driving systems are provided by Tesla, Waymo, and Nuro.

Figure 2A:
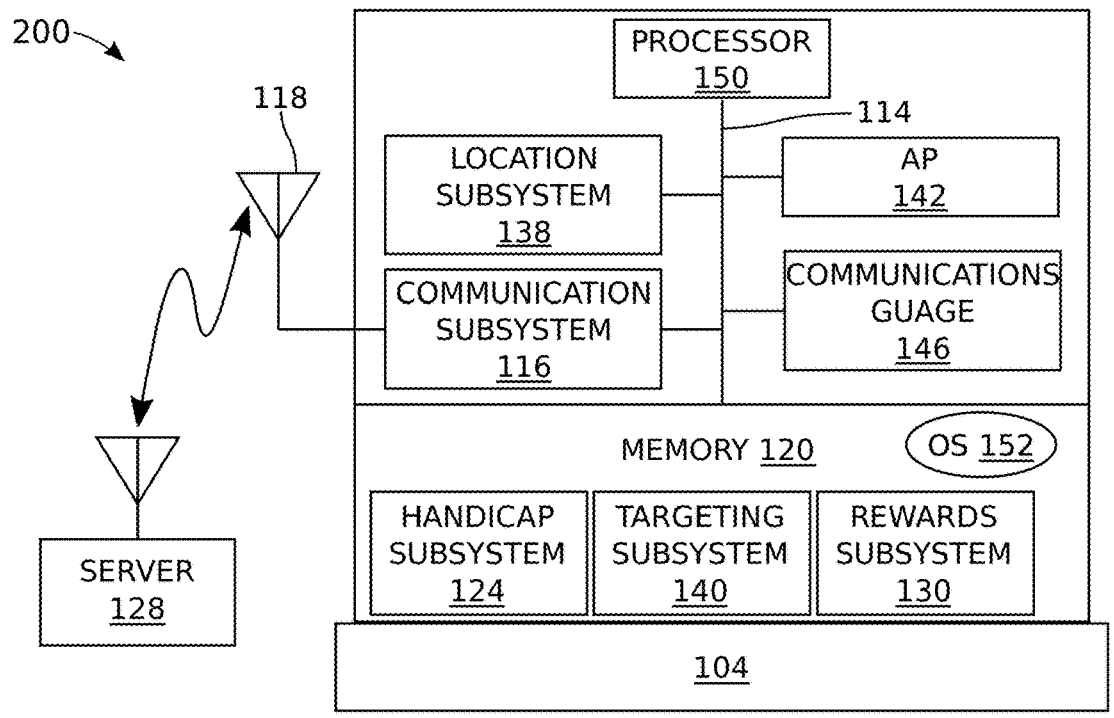
FIGS. 2A and 2B are schematic block diagrams depicting a public exposure monitored communications hub system.
Figure 2B:
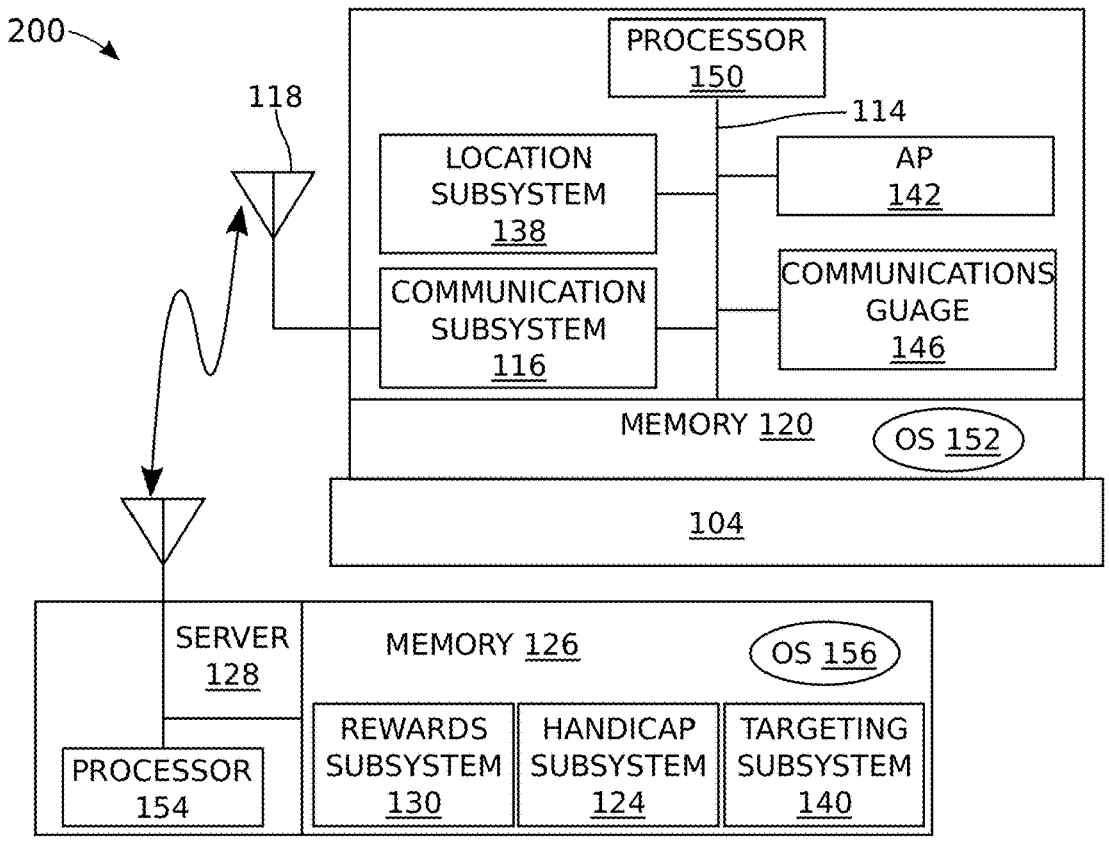

FIGS. 2A and 2B are schematic block diagrams depicting a public exposure monitored communications hub system. The system 200 comprises a publically accessible access point 142, which may be selectively engaged. The AP 142, configured for attachment to a mobile platform 104, may be a WLAN (e.g., WiFi)), a WPAN (e.g., Bluetooth), or both a WLAN and WPAN. A communications subsystem 116 is configured for attachment to the mobile platform 104, and has an antenna interface 118 to transceiver AP communications with a central control server 128. A communication gauge 146 has an output on line 114 to supply a measurement of communication statistics. A handicap subsystem 124 modifies the communication value associated with AP enablement in response to the communication statistics. A rewards subsystem 130 provides a reward to an entity in response to the communication value offset by the communication statistics. In one aspect, a location subsystem 138 is configured for attachment to the AP 142, and has an output on line 114 to supply a geographic location of the AP. A targeting subsystem 140 is used for selecting an AP target geographic location from a plurality of potential target geographic locations having corresponding location values. The communications subsystem 116 receives verification information including a selected target geographic location. In this case, the rewards subsystem 130 may provide a reward to an entity in response to a combination of the communication value and the location value. In one aspect, the handicap subsystem 124 modifies the calculation of the communication value offset in response to the selected geographic location.

In FIG. 2A, the handicap subsystem 124, rewards subsystem 130, and targeting subsystem 140 are enabled as software applications, along with OS 152, in local memory 120. In FIG. 2B, the communications subsystem 116 communicates the communication statistics and AP location to server 128, and the handicap subsystem 124, rewards subsystem 130, and targeting subsystem 140 are enabled as software applications, along with OS 156, in server memory 126.

In one aspect, the system 200 shown in FIGS. 2A and 2B may further include a media projection subsystem (not shown), as described in the explanation of FIG. 1A.

Figure 3:
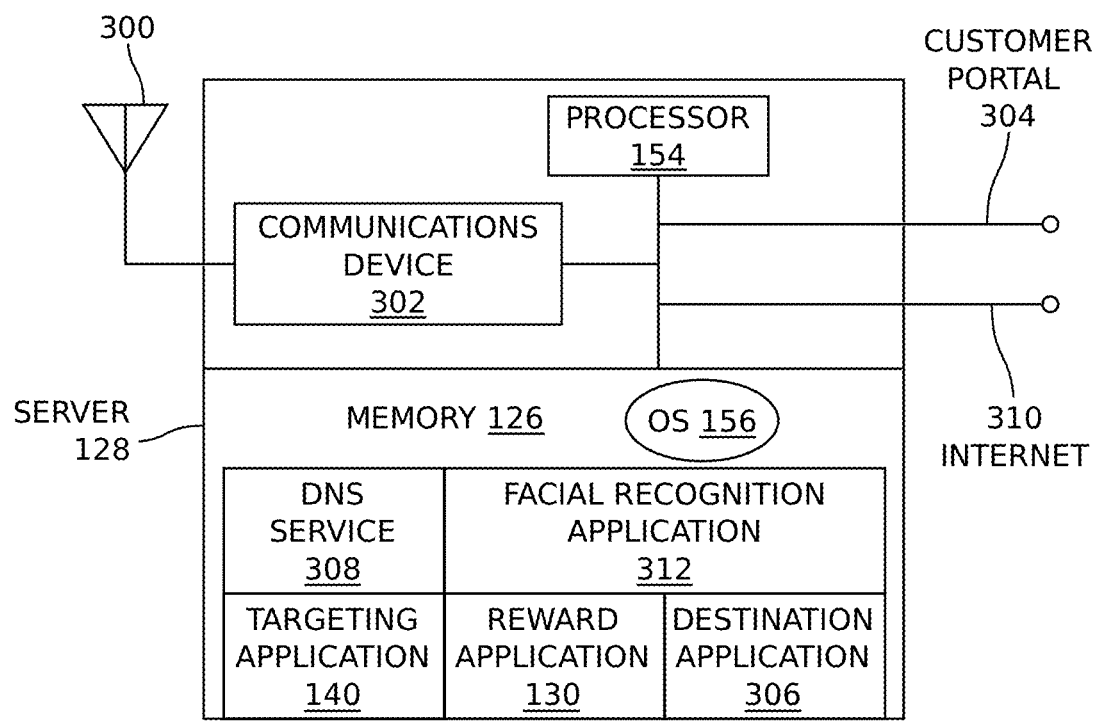
FIG. 3 is a schematic block diagram of the server depicted in FIGS. 1A and 2B.

FIG. 3 is a schematic block diagram of the server depicted in FIGS. 1A and 2B. For convenience, all the components associated with server 128 are shown embedded as a single schematic block, but it should be understood that these components are not necessarily embedded in a single hardware unit or server, or in communication with each other. Alternatively, the software applications may be cooperating components of an overall software system. As shown, the server 128 is connected to antenna 300 through communications device 302, to receive the verification information, exposure measurements, and other information from the system (100, see FIG. 1A). Although depicted as a wireless communications system, it should be understood that the linkage represented by the communication device may represent Internet and Ethernet linkages to cell tower base stations and cloud search engines, or any other means of communication, and may generally be referred to as portal.

A second interface on line 304, also referred to as a customer portal, receives client goals such target market, deployment hours, deployment rate, and positions to name a few examples. The customer portal on line 304 may also receive explicit destination and/or media selection instructions from a second entity (a client or server provider). Alternatively, a destination application 306 is embedded in memory 126, including processor instructions for automatically (without direct human intervention) determining the destination instructions in response to client goals. In one aspect, the destination application is a machine learning (ML) model that is trained by sampling a plurality of manual instructions previously supplied by the second entity, and which infers destinations from the model. Destination instructions may also be responsive to the targeting 140 and rewards application 130. The client goals and targeting may be responsive to factors such as location, local demographics, traffic, population density, length of deployment, and combinations thereof. An operating system 156 works in cooperation with the processor 154 to enable software applications in memory 126 and to process information to-and-from communications device 302.

Considering FIGS. 1A, 2A, 2B, and 3, the access point 142 can be used to support a type of data mapping. The access point is publically accessible to user devices 148 that include smartphones, personal devices, or generally, any type of computing device. Typically, the user devices 148 are enabled for WiFi and Bluetooth communications. As used herein, the term data mapping includes the collection of data from the user devices 148. In one aspect, user data information (e.g., addresses) is collected voluntarily, with the user explicitly agreeing to data collection in response to an access point provided services, such as the provision of an Internet browser, email, Internet, or social media services. For example, if the access point 142 is a WiFi hotspot that accepts Uniform Resource Locator (URL) address requests from a user device (e.g., a smartphone), the URL address requests may be transmitted to a Domain Name System (DNS) service 308 embedded with server 128. The DNS service 308 makes address searches, if necessary, via the Internet interface on line 308. Likewise, the customer portal may be enabled using the Internet interface on line 310. Otherwise, the information is collected without an explicit agreement by the user, where legal. Rewards to the first or second entities may be based upon the volume of traffic through the WiFi hotspot or access point data collected. In some aspects, camera images, in cooperation with a facial recognition software application 312 (e.g., DeepFace), are used for data tracking.

Figure 4:
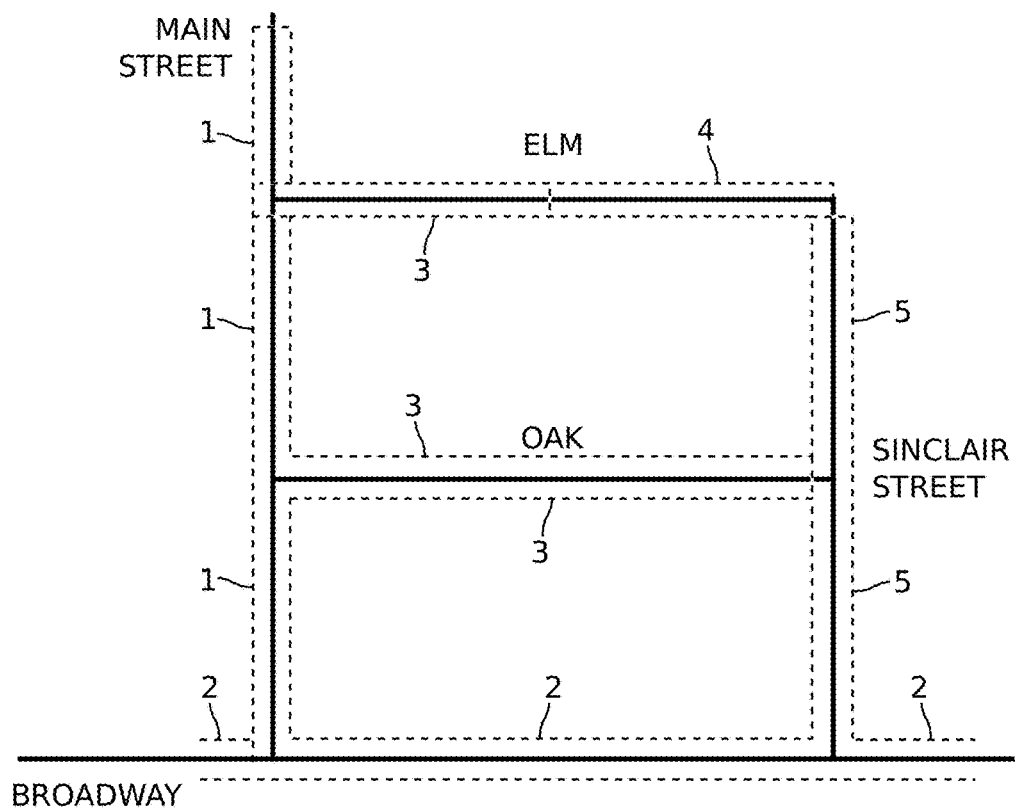
FIG. 4 is a plan view of geographic regions cross-referenced to the weighted value of various stationary positions.

FIG. 4 is a plan view of geographic regions cross-referenced to the weighted value of various stationary positions. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5.

The systems described above can be adapted for use in a model where an advertiser or commercial entity pays for service based upon performance. For example, an advertising (server) client may contract with a system provider stipulating a target market and deployment hours/rate. The system provider (intermediary organization) determines geo-fenced locations that meet or exceed the advertiser's target market based on location, demographics, traffic, population density, and other variables. Platform deployment time, location, quality code, and user information are recorded by the server. A system provider algorithm determines platform performance based on length of deployment, contracted rate, maintenance cost reimbursement, and location quality code.

The systems described above support a targeted location system, where the mobile display or access point may be selectively deployed. In cooperation with the deployment of the display and/or access point, an organization or associated user is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the display and/or access point have actually been deployed, and once deployed, the location of the system.

Figure 5:
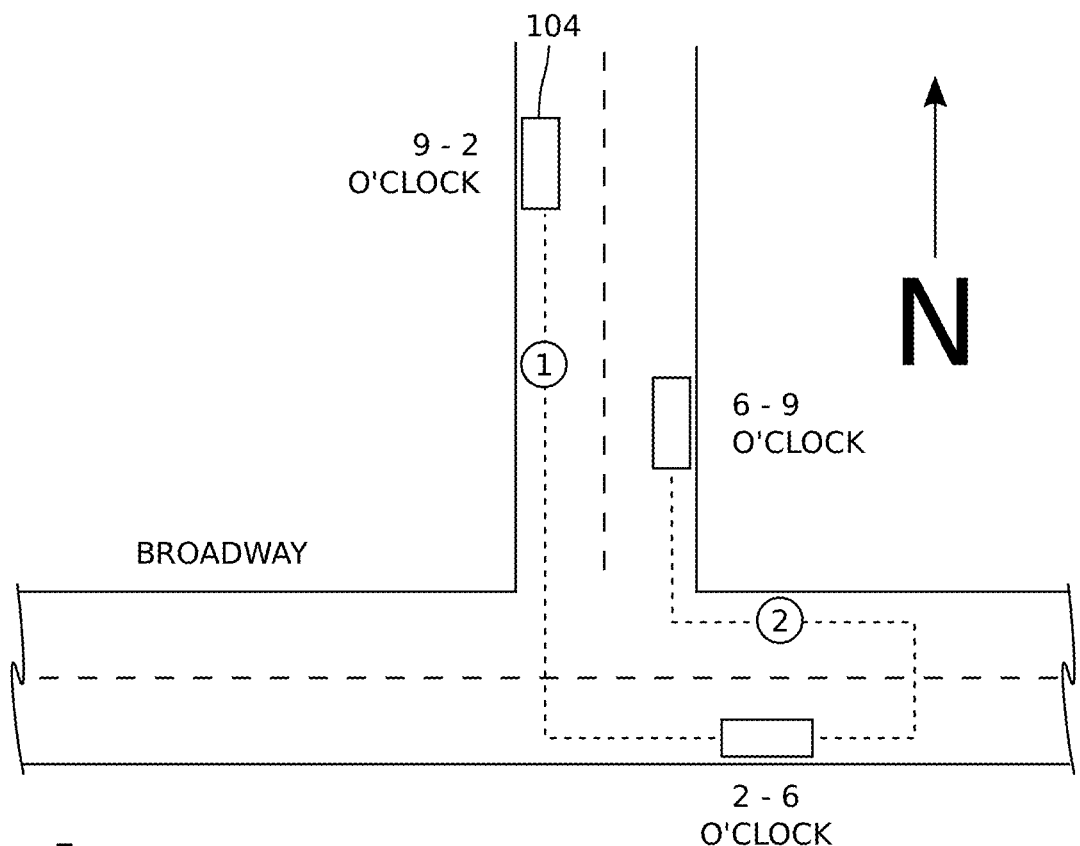
FIG. 5 is a diagram depicting an exemplary series of mobile platform destinations with reference to FIG. 1A.

FIG. 5 is a diagram depicting an exemplary series of mobile platform destinations with reference to FIG. 1A. Initially, mobile platform 104 is parked on Main Street. The platform 104 is shown parked along the West side of Main Street in the hours from 10 until 2 o'clock. An entity sends instructions or otherwise moves the mobile platform 104 at 2 o'clock to the South side of Broadway, where it is parked from 2 until 6 o'clock. The entity then sends instructions or otherwise moves the mobile platform 104 at 6 o'clock to the East side of Main Street, where it is parked until 9 o'clock.

Figure 6:
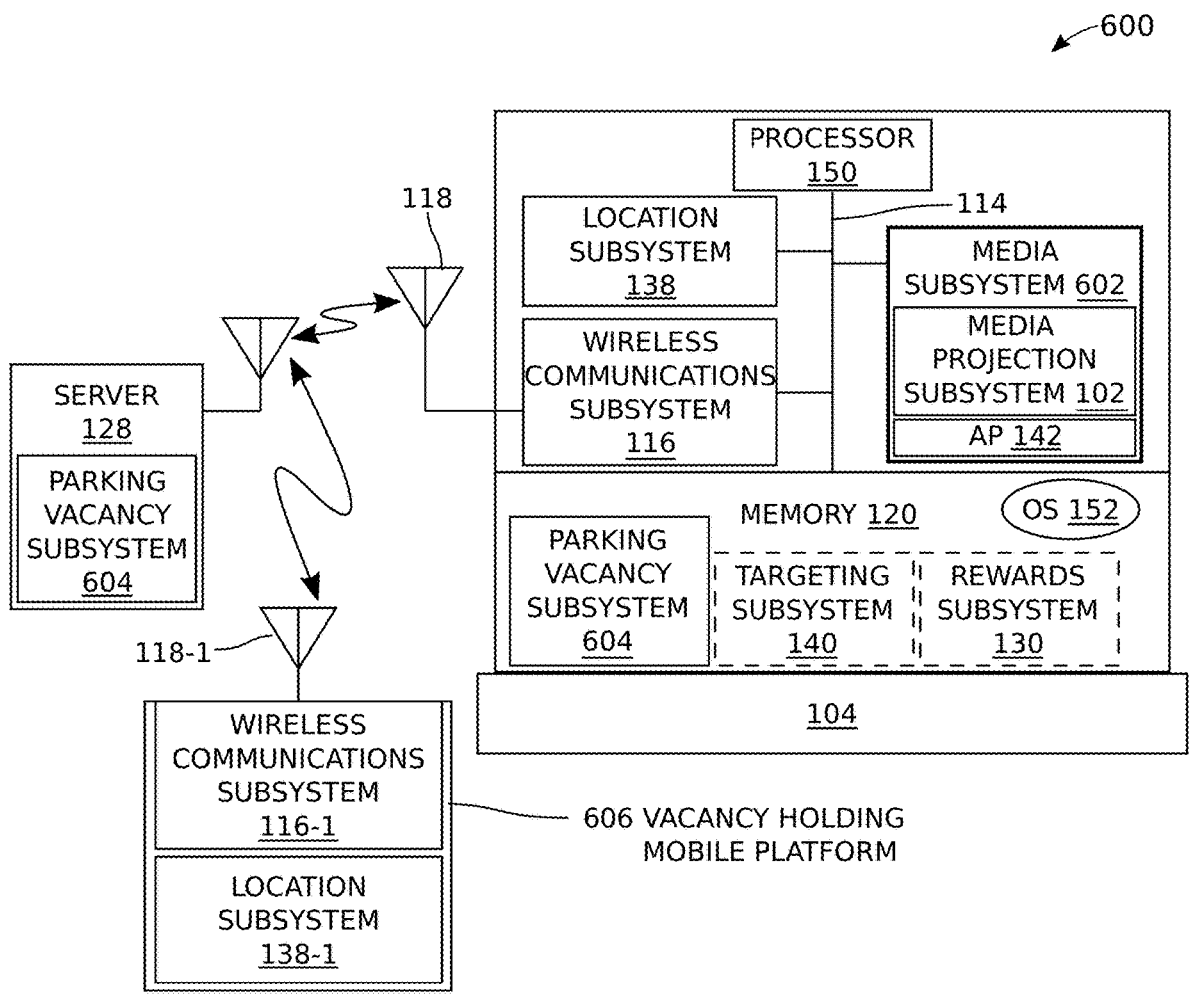
FIG. 6 is a schematic block diagram depicting a system for directing mobile media platforms to predicted vacant parking locations.

FIG. 6 is a schematic block diagram depicting a system for directing mobile media platforms to predicted vacant parking locations. The system 600 comprises a media subsystem 602, which may be selectively enabled, configured for attachment to a mobile platform 104. The media subsystem 602 may be a media projection subsystem 102, a publically accessible WLAN and/or WPAN access point 142, or both an AP and media projection subsystem (as shown). A location subsystem 138 determines the geographic location of the mobile platform 104. A parking vacancy subsystem 604 has an output on line 114 to supply predicted vacant parking locations. The parking vacancy subsystem 604 can be enabled as a software application in server 128, or as shown in phantom, in local memory 120. Alternatively, components of the parking vacancy subsystem 604 may reside in both the server 128 and in local memory 120. The software application includes a sequence of processor executable steps for supplying the parking predictions. A wireless communications subsystem 116 has an antenna interface 118 to receive verification information including the mobile platform geographic location and to receive predicted vacant parking locations. Details of the AP 142, media projection subsystem 102, and communication subsystem have been provided in detail above, and are not repeated here in the interest of brevity.

The parking vacancy subsystem 604 may alternatively be referred to as a parking guidance and information (PGI) systems, or a car park guidance system that presents drivers with dynamic information on parking within controlled areas. Conventionally, PGI systems are designed to aid in the search for vacant parking spaces by directing drivers to car parks where occupancy levels are low. For example, Parksonic is a provider for parking guidance technology and services in the United States. An automated parking guidance system (APGS), or PGS, adds the element of traffic monitoring. Mobile applications also exist that help drivers find parking, such as AppyParking, which displays both the cheapest and nearest on and off street parking rules for 14 major cities in the UK including London, as well as seeing live availability of parking bays where available. It also includes daily gas prices for every gas station in the UK through an in-app subscription. ParkWhiz, SpotHero, and JustPark are applications that allow for mobile booking at participating lots, garages, and hotels. As noted in US 2014/0214319, parking recommendations can be based on predictions derived from historical data. While most these systems suffer from the lack of universal coverage and real-time data, accurate real-time parking information systems can be developed using a combination of parking meter monitoring, road embedded sensors, drone monitoring, and even satellite images.

In one aspect, the media subsystem 602 is associated with a first entity associated with (e.g., owning) the media subsystem or mobile platform, and the communication subsystem 116 sends a request from the first entity to the parking vacancy subsystem for a predicted vacant parking location. Alternatively, the parking vacancy subsystem 604 may receive a request from a second entity (e.g., an advertiser client), different than the first entity, for a predicted vacant parking location, and the communications subsystem 116 receives the predicted vacant parking location in response to the request made by the second entity. In either case, the mobile platform may be moved by autonomous means.

As in the systems described above, system 600 may further comprise a targeting subsystem 140 for selecting a media subsystem 602 target geographic location from a plurality of potential value weighted target geographic locations. In this case, the parking vacancy subsystem 604 supplies a predicted vacant parking location in the selected target geographic location. The targeting subsystem 140 can be enabled as a software application in server memory (not shown), or as shown in phantom, in local memory 120. A rewards subsystem 130 may provide a reward to an entity in response to the weighted value of the selected target geographic location. The rewards subsystem 130 can be enabled as a software application in server memory (not shown), or as shown in phantom, in local memory 120.

In one aspect, the parking vacancy subsystem 604 receives a request for a first media subsystem 602 requesting a predicted parking vacancy in a first geographic region. In this aspect, the system 600 further comprises a vacancy holding mobile platform 606. The vacancy holding mobile platform includes a location subsystem 138-1 to determine a geographic location of the vacancy holding mobile platform and a wireless communications subsystem 116-1. The wireless communications subsystem 116-1 has an antenna interface 118-1 to transmit the occupation of a parking location in the first geographic region, and to receive instructions for surrendering the occupied parking location to the first media subsystem. The vacancy holding mobile platform 606 may be a ground-based vehicle or an airborne vehicle.

Figure 7A:
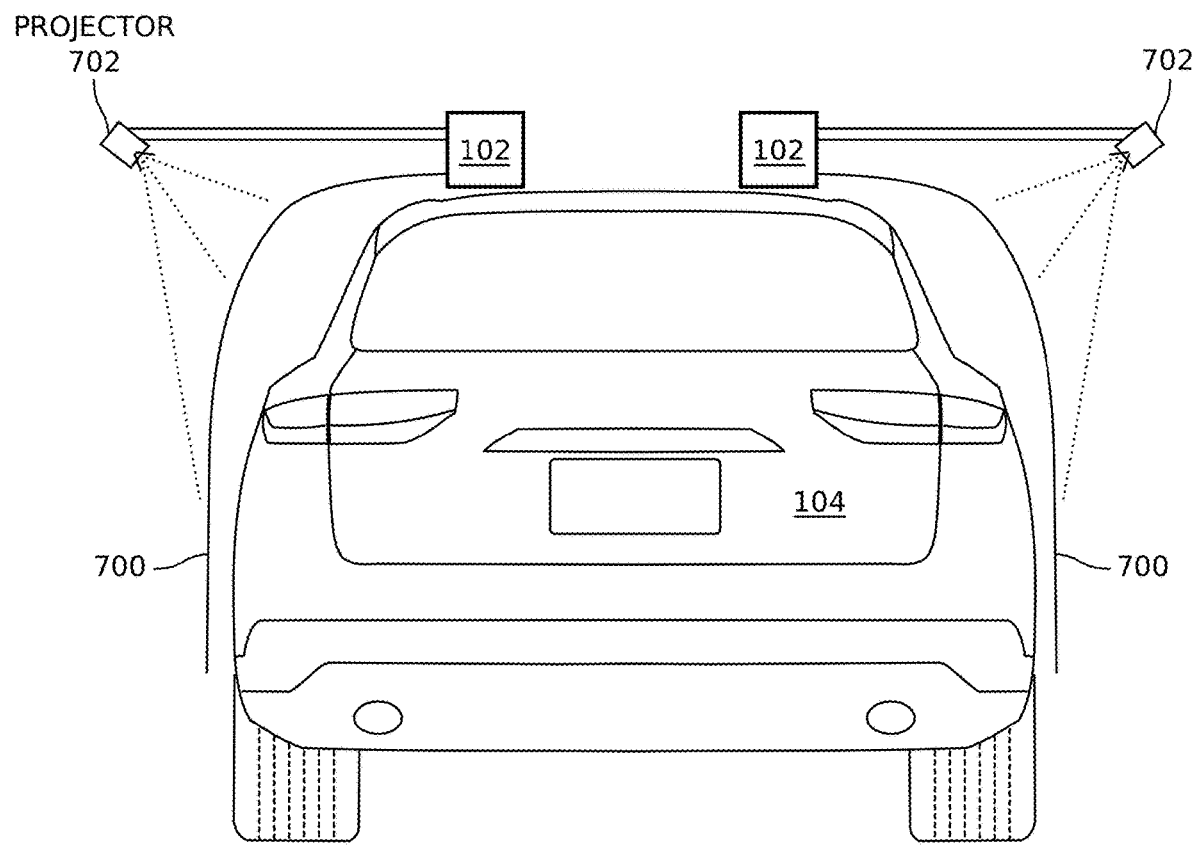
FIGS. 7A and 7B are diagrams depicting the media subsystem enabled as an image projector.
Figure 7B:
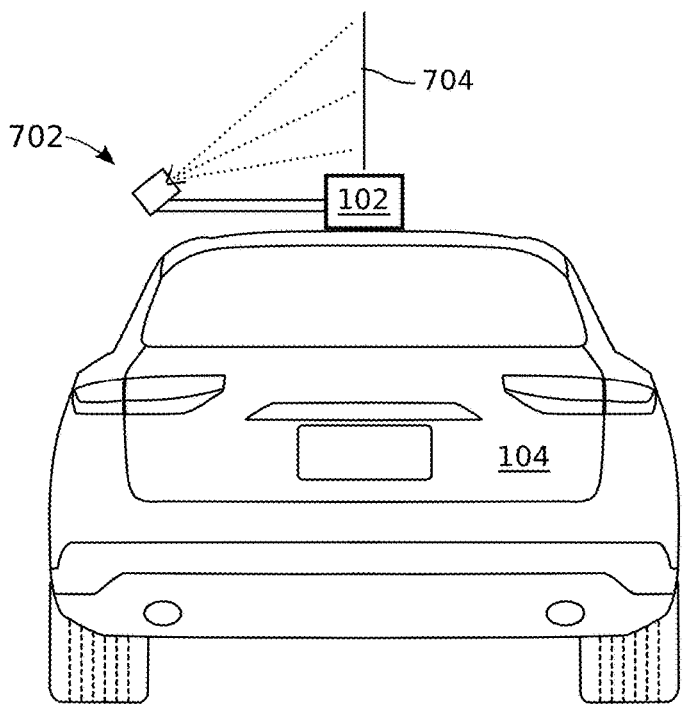

FIGS. 7A and 7B are diagrams depicting the media subsystem enabled as an image projector. Here, the media projection subsystem 102 is configured for attachment to the roof of an automotive vehicle 104. In FIG. 7A a viewing screen 700 is deployed over an exterior surface (e.g., door) of the automotive vehicle 104. However, it should be understood that the viewing screen may, alternatively, be deployed over other exterior surfaces (e.g., front or back). Here, two media projection subsystems 102 are shown with associated projectors 702, and with screens 700 overlying driver and passenger side doors. However, the system is not limited to any particular number of chasses, with supporting subsystems. In FIG. 7B a popup 704 extends vertically from a substantially planar horizontal roof. Alternatively but not shown, the imaging projector subsystem may project images on both sides of the popup viewing screen, or more than one chassis/viewing screen/imaging projector subsystem may be attached to the roof. Otherwise, the popup screen may be a simple printed screen or an LCD/LED screen.

Figure 8:
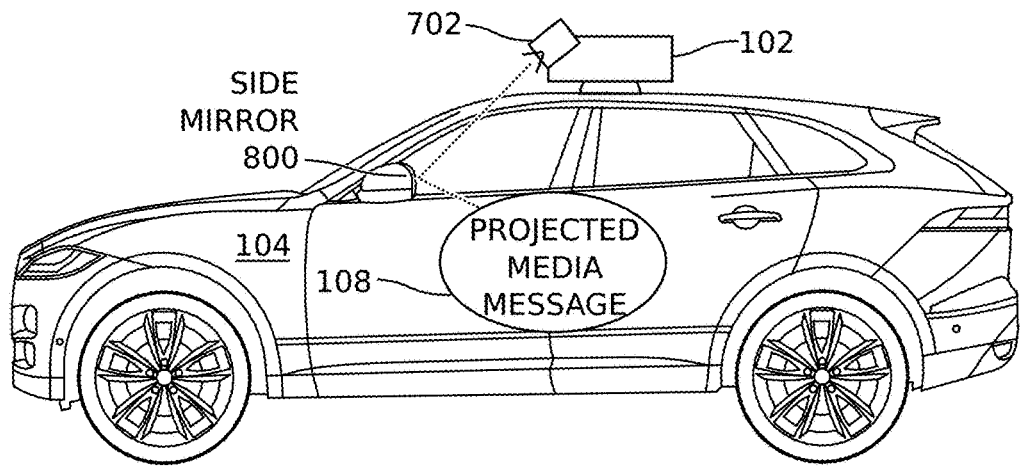
FIG. 8 depicts a variation of the media subsystem enabled as an image projector.

FIG. 8 depicts a variation of the media subsystem enabled as an image projector. In this aspect the media projection subsystem 102 (as described above) is configured for attachment to a roof of an automobile 104, having a side mirror 800. An imaging projector 702 is selectively engageable to project an image (projected media message) on the side mirror 800, with the image being reflected by the side mirror. The image can be reflected, for example, on a vertical exterior surface of the automobile (e.g., door) as shown, a sidewalk located adjacent to the automobile, or a wall located adjacent to the automobile. In some aspects, if the imaging surface is a dark color or a rough surface, a portable screen may be temporarily attached to the surface. For example, in the case of a car door imaging surface, a magnetic screen could be temporarily applied to the door, or the screen could be hung from the top of the door or clamped by the window.

Figure 9:
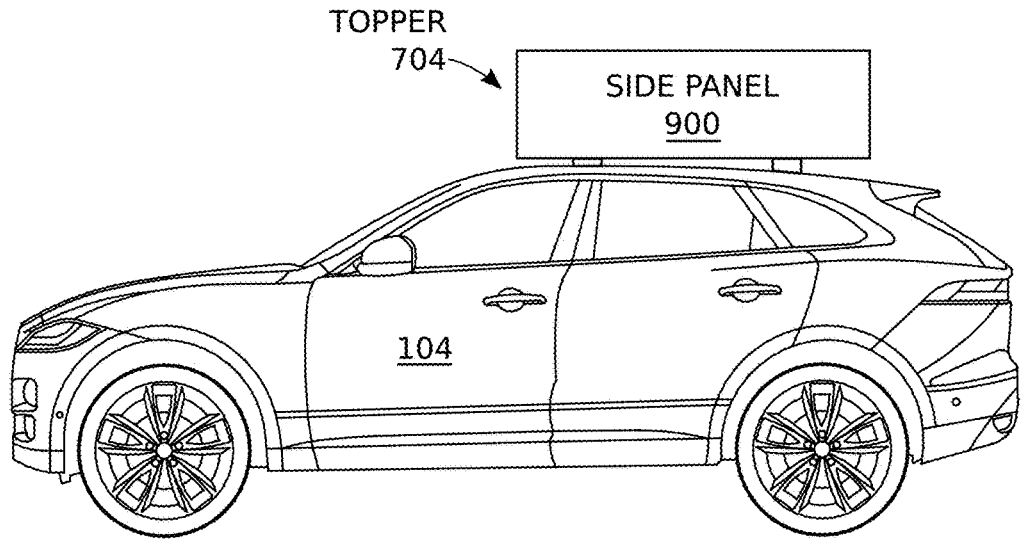
FIG. 9 depicts the media subsystem enabled as a topper.

FIG. 9 depicts the media subsystem enabled as a topper. The media projection topper 704 is configured for attachment to a roof of the vehicle 104, having display side panels 900 to project media. A topper is typically a narrow width rectangular box, with the narrow width facing (orthogonal to) a vehicle's front and rear ends. The rectangular box length is formed by vertically oriented side panels parallel to the vehicle doors. Media messages are formed on the side panels. Typically the side panels are backlit so the media messages can be seen at night. Toppers are often used for advertising, as mounted on taxis or commercial automobiles.

Figure 10:
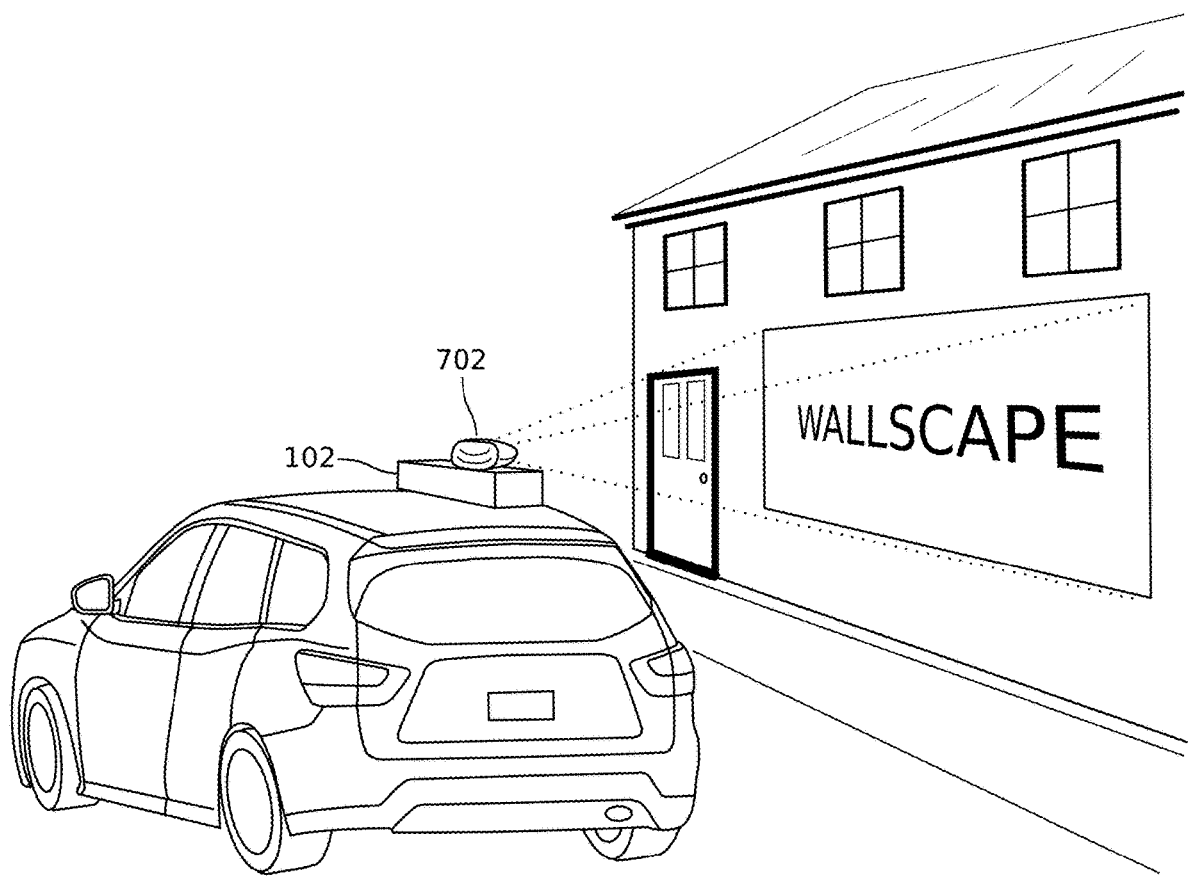
FIG. 10 is a diagram depicting the media subsystem enabled as a wallscape.

FIG. 10 is a diagram depicting the media subsystem enabled as a wallscape. As shown, the media projection subsystem 102 and imaging projector 702 are configured for attachment to the roof of an automobile. The imagine projector 702 is selectively engageable to project an image on an adjacent vertical wall surface when the mobile platform 104 is parked in a stationary geographic location.

Figure 11:
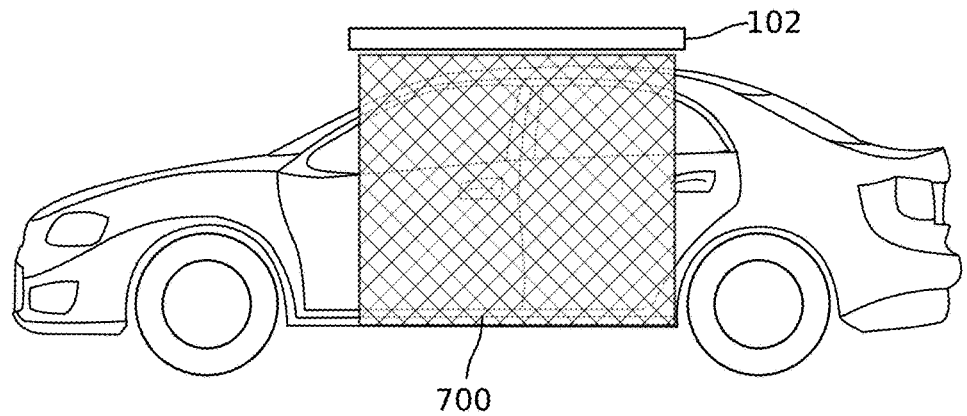
FIG. 11 is a diagram depicting the media subsystem enabled as a retractable screen.

FIG. 11 is a diagram depicting the media subsystem enabled as a retractable screen. The media projection subsystem 102 is mounted to an automobile roof and the screen 700 is retractable. The screen 700 may be printed with a fixed advertising message, warning, or alert. In one aspect, the screen includes a field of light emitting diodes (LEDs), liquid crystal display (LCD), or an electroluminescent (EL) display, for projecting (i.e., creating) a visual image.

Figure 12A:
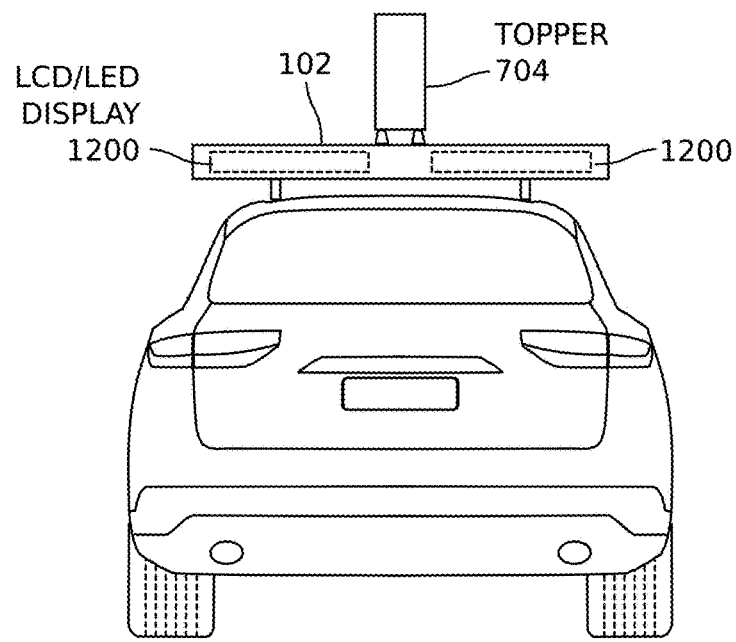
FIGS. 12A through 12C depict the media subsystem enabled as an LCD or LED display.
Figure 12B:
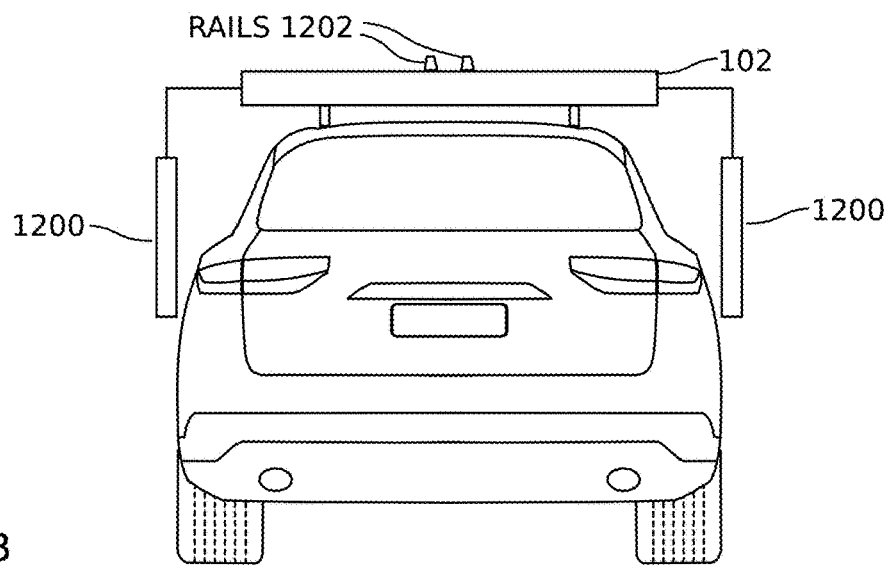
Figure 12C:
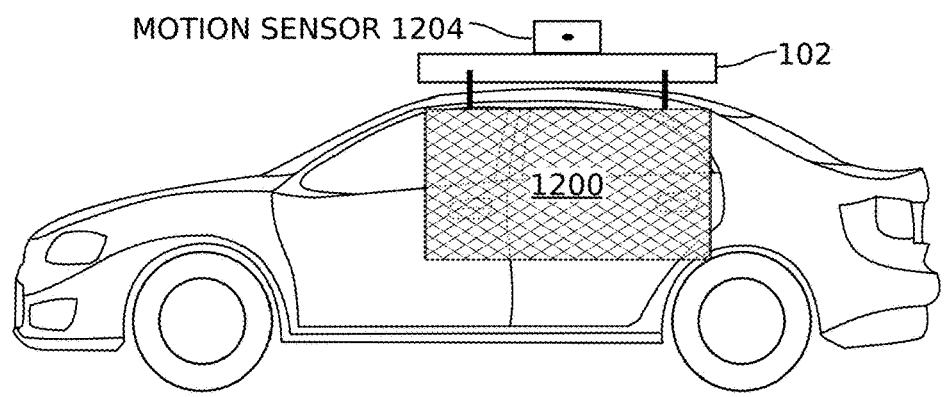

FIGS. 12A through 12C depict the media subsystem enabled as an EL, LCD, or LED display. In FIG. 12A rigid panel displays 1200 (shown in phantom) are secured inside chassis 102 for storage while the vehicle is being moved. In FIGS. 12B and 12C the displays 1200 are deployed over an exterior surface of the vehicle. FIG. 12A also depicts a topper 704 secured to the top of the media projection subsystem chassis, as shown for example by roof rack type rails 1302. FIG. 12C depicts a motion sensor 1204 mounted on the chassis 102 or on the display (not shown). The motion sensor permits the displays to be powered down, to save energy, if no pedestrian or vehicular traffic is detected.

Figure 13A:
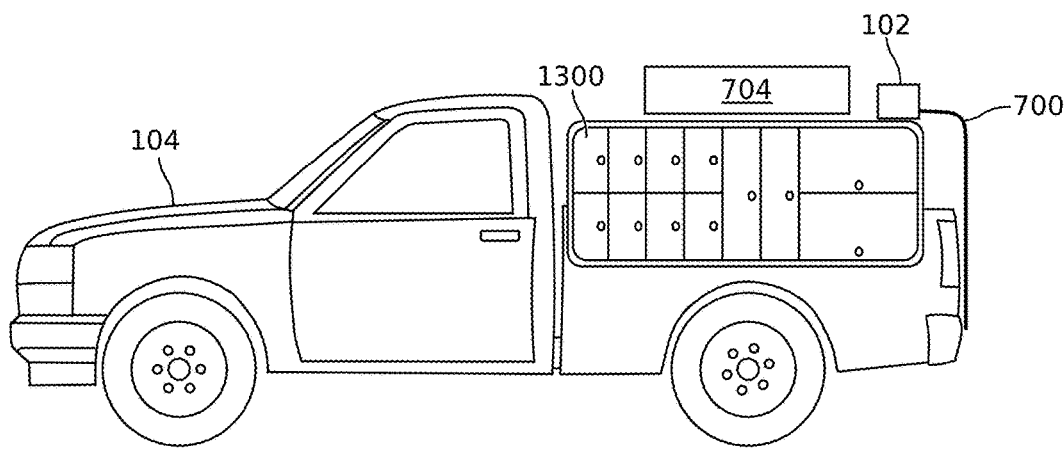
FIG. 13A is a diagram depicting a mobile platform including a mobile locker system in combination with a media subsystem.

FIG. 13A is a diagram depicting a mobile platform including a mobile locker system in combination with a media subsystem. The mobile locker system 1300 is described in detail in parent application Ser. No. 17/097,256, filed on Nov. 13, 2020, entitled SYSTEM AND METHOD FOR MOBILE GIG LOCKER, and which is incorporated herein by reference. Besides the mobile lockers 1300, the mobile platform 104 also includes a mobile media projection subsystem 102 with a deployed viewing screen 700, and a topper 704. Although a pickup truck mobile platform 104 is shown as an example, it should be noted that the combination of the mobile lockers 1300 and media subsystem are not limited to any particular type of mobile platform. Likewise, although a topper 704 and screen 700 are shown as examples, the combination of mobile lockers and media subsystem are not limited to any particular media projection subsystem. Although not explicitly shown in this figure, the combination of mobile locker and media subsystem may further include a publically accessible access point, as described above.

Figure 13B:
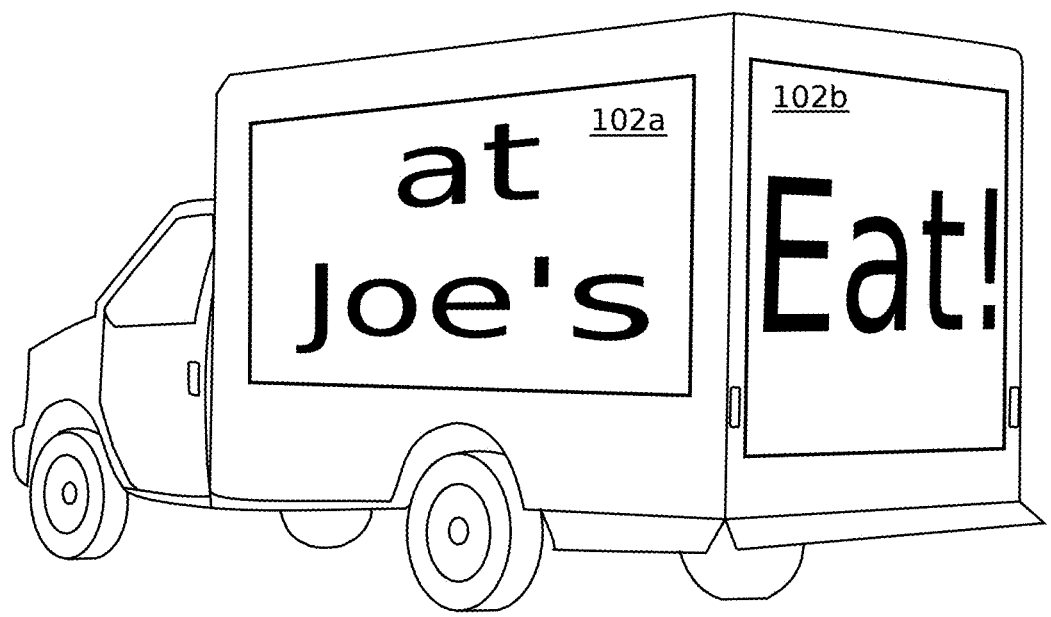
FIG. 13B is a diagram depicting a media projection subsystem formed on multiple surfaces of a truck body.

FIG. 13B is a diagram depicting a media projection subsystem 102 formed on multiple surfaces of a truck body. The media projection subsystems 102a and 102b may be EL, LCD, or LED displays, electronic displays enhanced with LED lighting, or simply printed or painted screens, or any of the other media projection substrate interfaces described herein. Media interfaces 102a and 102b may be portions of a coordinated mobile media integrated display, or independent displays. Although not shown, the right side of the truck may also include a media projection subsystem interface display. Also not shown, the media projection subsystem interfaces in this example may be portions of a coordinated media in combination with other media projection subsystem interfaces described herein.

Figure 14:
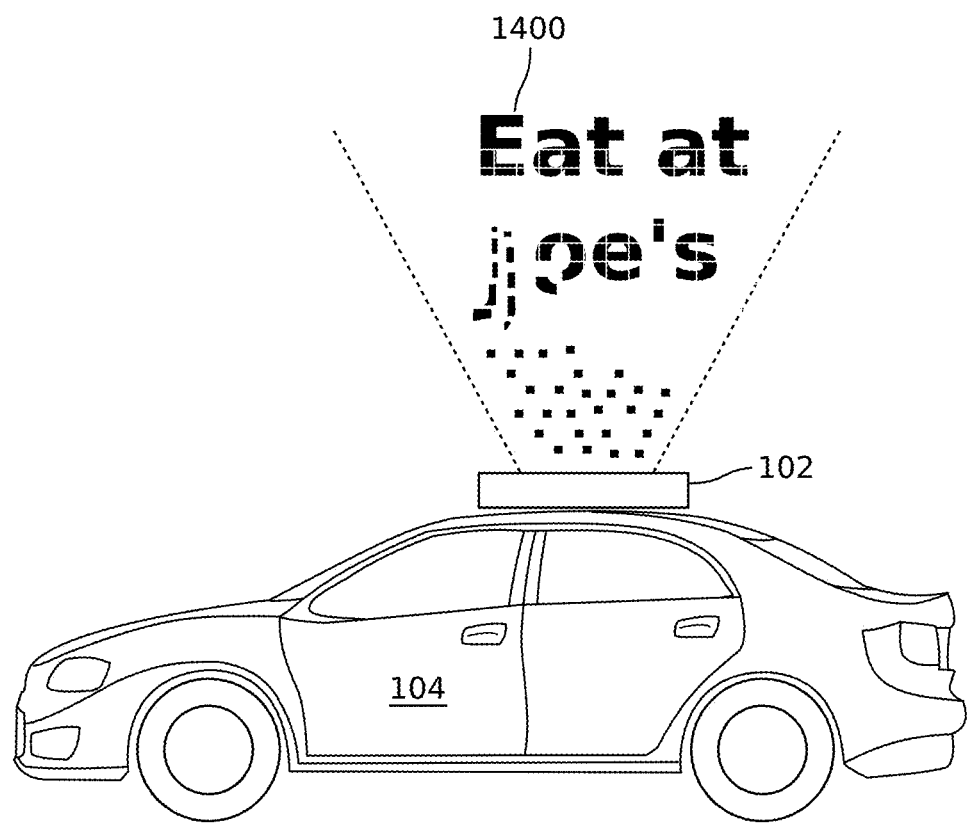
FIG. 14 is a diagram depicting the media projection subsystem as a holographic image.

FIG. 14 is a diagram depicting the media projection subsystem as a holographic image. In this example, the mobile platform 104 is a car, the media projection subsystem 102 is mounted on the roof of the car to present a holographic image 1400. Although the image is presented overlying the mobile platform 104, alternatively it may be presented adjacent to the platform, for example, in the form of a persistent image fan. The holographic image may be a portion of a coordinated media in combination with another holographic image or any of the other above-described media projection subsystem interfaces.

Figure 15:
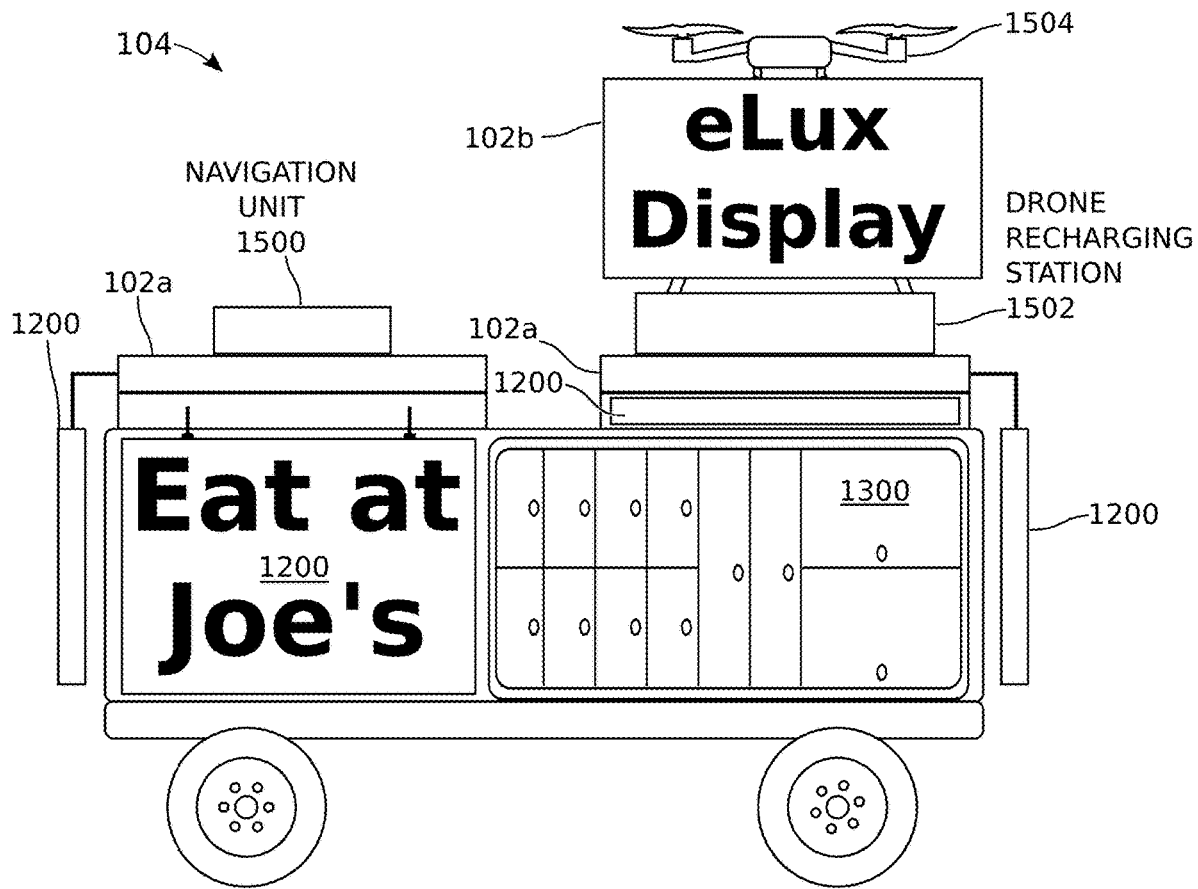
FIG. 15 is a drawing depicting an autonomous driving mobile platform.

FIG. 15 is a drawing depicting an autonomous driving mobile platform. The mobile platform 104 is equipped with a plurality of media projection subsystems 102a enabled in this example as electronic or passive display screens 1200, but it should be understood that other types of media projection subsystems may also be used. The display screens 1200 are retractable into media projection subsystem chasses for storage, when the platform 104 is moving, or to expose lockers 1300 mounted behind the screens. Although only three sides of the vehicle 104 are depicted, it should be understood that lockers and displays may also be arranged on the unseen side of the platform. The autonomous platform 104 also comprises a navigation unit 1500. The navigation unit may include an autonomous driving application stored in a non-transitory navigation unit memory and enabled as a sequence of processor executable steps for autonomously driving the mobile platform to a selected mobile platform geographic location destination. As would be understood in the art, a vehicle equipped for autonomous driving might include sensors such as cameras, LIDAR, SONAR, photodector ranging systems, and inertial measurement units (IMUs), which would also be included as part of the navigation unit 1500. Obviously, such an equipped vehicle would include mechanisms for steering, braking, and acceleration. Examples of commercial autonomous self-driving systems are provided by Tesla, Waymo, and Nuro. The navigation unit 1500 would also likely include location and communication subsystems, as described above.

In one aspect, the autonomous mobile platform 104 further comprises a drone charging station 1502. The charging station 1502 has a top surface to accept a drone or unmanned aerial vehicle (UAV) 1504 for landing, and to recharge or refuel the drone so that it is able to remain on station in the air for extended periods of time. The drone 1504 also includes media projection subsystem 102b enabled as one of the above-mentioned screen or display types. In one aspect, the drone 1504 can be securely fastened to the recharging station 1502 for transportation on the ground via the mobile platform 104.

Figure 16:
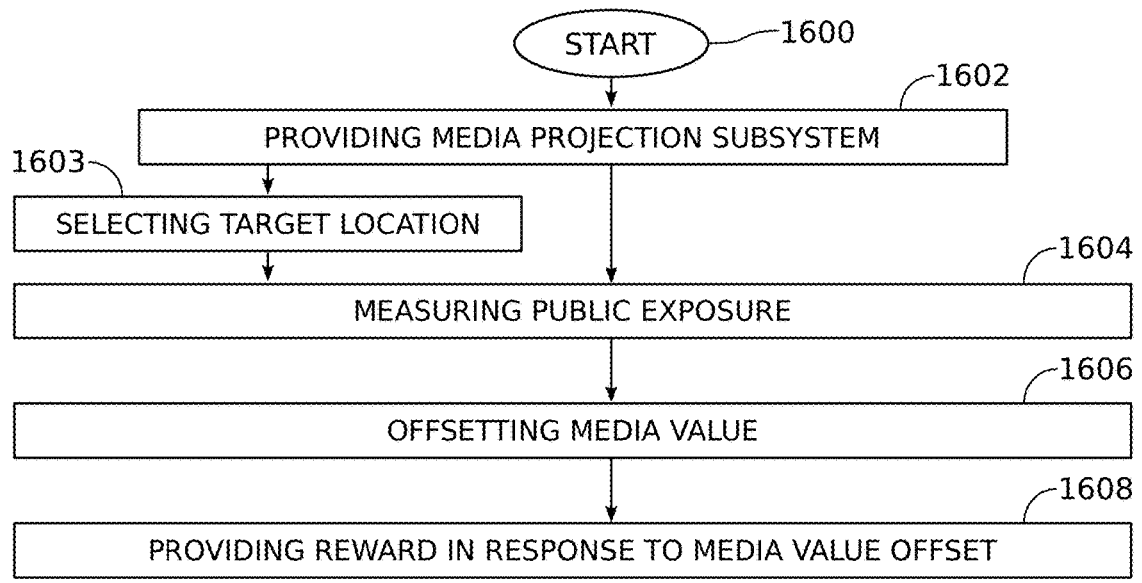
FIG. 16 is a flowchart illustrating a method for monitoring media projection system public exposure.

FIG. 16 is a flowchart illustrating a method for monitoring media projection system public exposure. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 1600.

Step 1602 provides a media projection subsystem, configured for attachment to a mobile platform. Step 1604 measures public exposure to projected media. For example, the actual viewing angle of the media projection subsystem may be measured. Step 1606 offsets a media value associated with the enablement of the media projection subsystem, calculated in response to the exposure measurements. In one aspect, Step 1608 provides a reward to an entity in response to the media value offset by the exposure measurement.

In another aspect, Step 1602 provides a location subsystem and Step 1603 selects a media projection subsystem target geographic location from a plurality of potential target geographic locations having corresponding location values. In this aspect, Step 1608 provides a reward to an entity in response to a combination of the offset media value and the location value. In another aspect, Step 1606 modifies the calculation of the media value offset in response to the selected geographic location.

In one aspect, Step 1602 provides a publically accessible access point (AP), which may be a WLAN, WPAN, or both. Then, Step 1605 measures communication statistics, and Step 1606 modifies a communication value associated with the AP in response to the communication statistics. Step 1608 may then provide a reward to an entity in response to the communication value offset by the communication statistics.

Figure 17:
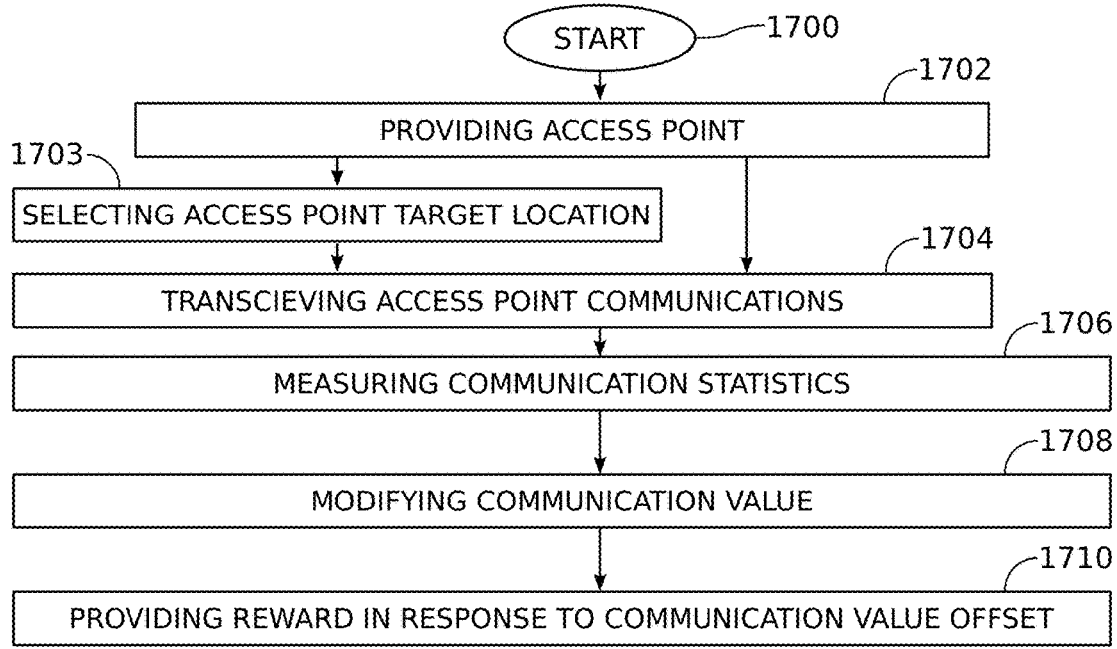
FIG. 17 is a flowchart illustrating a method for monitoring a communications hub's public exposure.

FIG. 17 is a flowchart illustrating a method for monitoring a communications hub's public exposure. The method starts at Step 1700. Step 1702 provides a publically accessible access point, which may be a WLAN, WPAN, or both a WLAN and WPAN. Step 1704 transceives AP communications with a central control server. Step 1706 measures communication statistics. Step 7008 modifies a communication value associated with AP enablement in response to the communication statistics. In one aspect, Step 1710 provides a reward to an entity in response to the communication value offset by the communication statistics.

In another aspect, Step 1702 provides a location subsystem, and Step 1703 selects an AP target geographic location from a plurality of potential target geographic locations having corresponding location values. In this aspect, Step 1710 may provide a reward to an entity in response to a combination of the communication value and the location value. In another aspect, Step 1708 modifies the calculation of the communication value offset in response to the selected geographic location.

Figure 18:
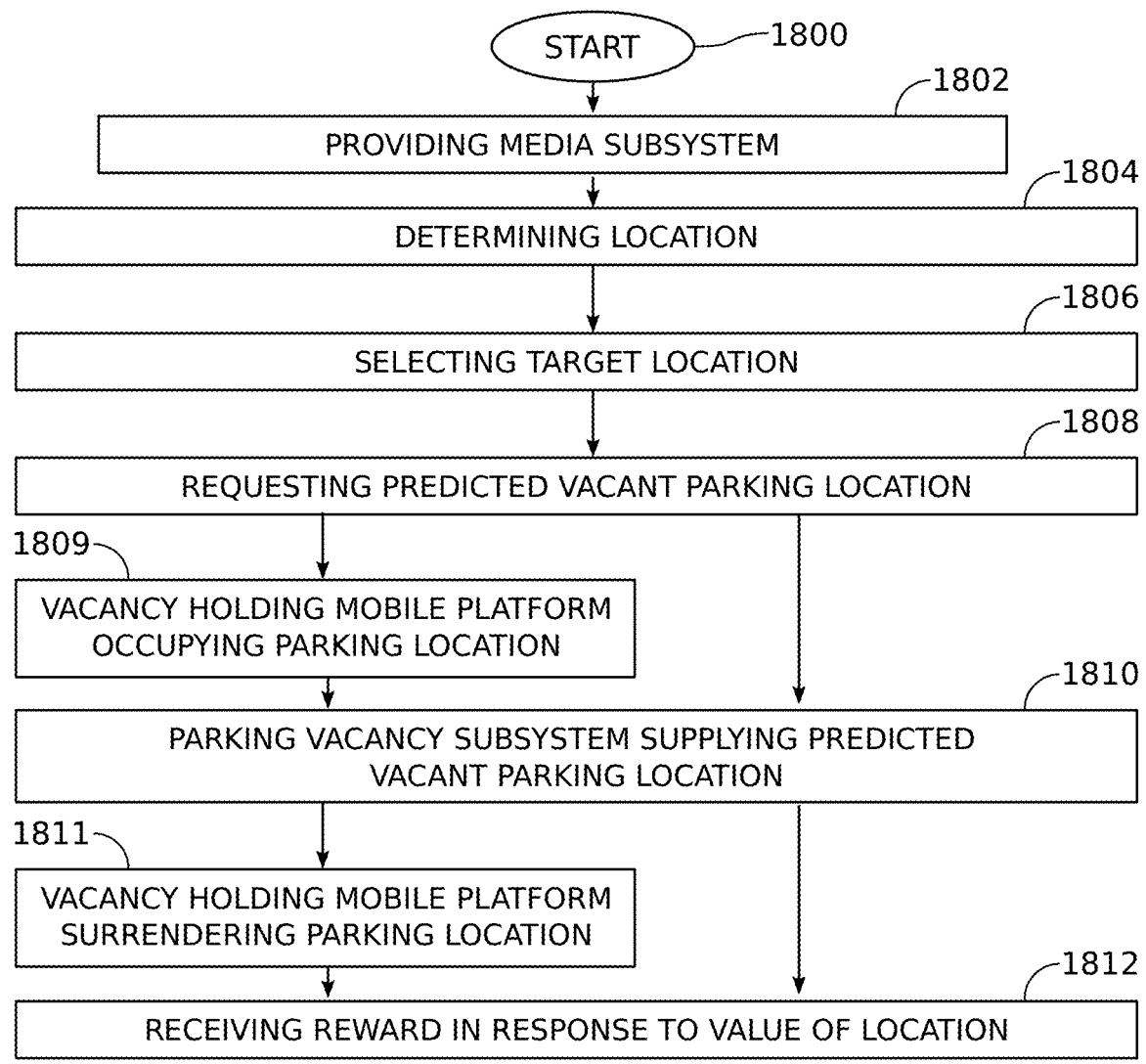
FIG. 18 is a flowchart illustrating a method for directing mobile media platforms to predicted vacant parking locations.

FIG. 18 is a flowchart illustrating a method for directing mobile media platforms to predicted vacant parking locations. The method begins at Step 1800. Step 1802 provides a media subsystem, which may include a media projection subsystem, a publically accessible AP including a WLAN, WPAN, or both a WLAN and WPAN. The media subsystem, which may be selectively enabled, may also include both the media projection subsystem and AP. Step 1804 determines a geographic location of the mobile platform. In Step 1806 a targeting subsystem selects a media subsystem target geographic location from a plurality of potential value weighted target geographic locations. Note: Step 1804 may be performed before or after Step 1806, or performed continuously. In Step 1808 a request is sent for a predicted vacant parking location. In Step 1810 a parking vacancy subsystem supplies a predicted vacant parking location in the selected target geographic location.

In one aspect, the media subsystem is associated with a first entity, and in Step 1808 the first entity sends a request to the parking vacancy subsystem for a predicted vacant parking location. Alternatively, in Step 1808 a second entity, different than the first entity, sends to request for a predicted vacant parking location. In one aspect an entity receives a reward in Step 1812, in response to the weighted value of the selected target geographic location.

In another aspect, in Step 1809 a vacancy holding mobile platform, which may be either a ground-based or airborne vehicle, occupies the vacant parking location, and in Step 1811 surrenders the occupied parking location to the first media subsystem.

Figure 19A:
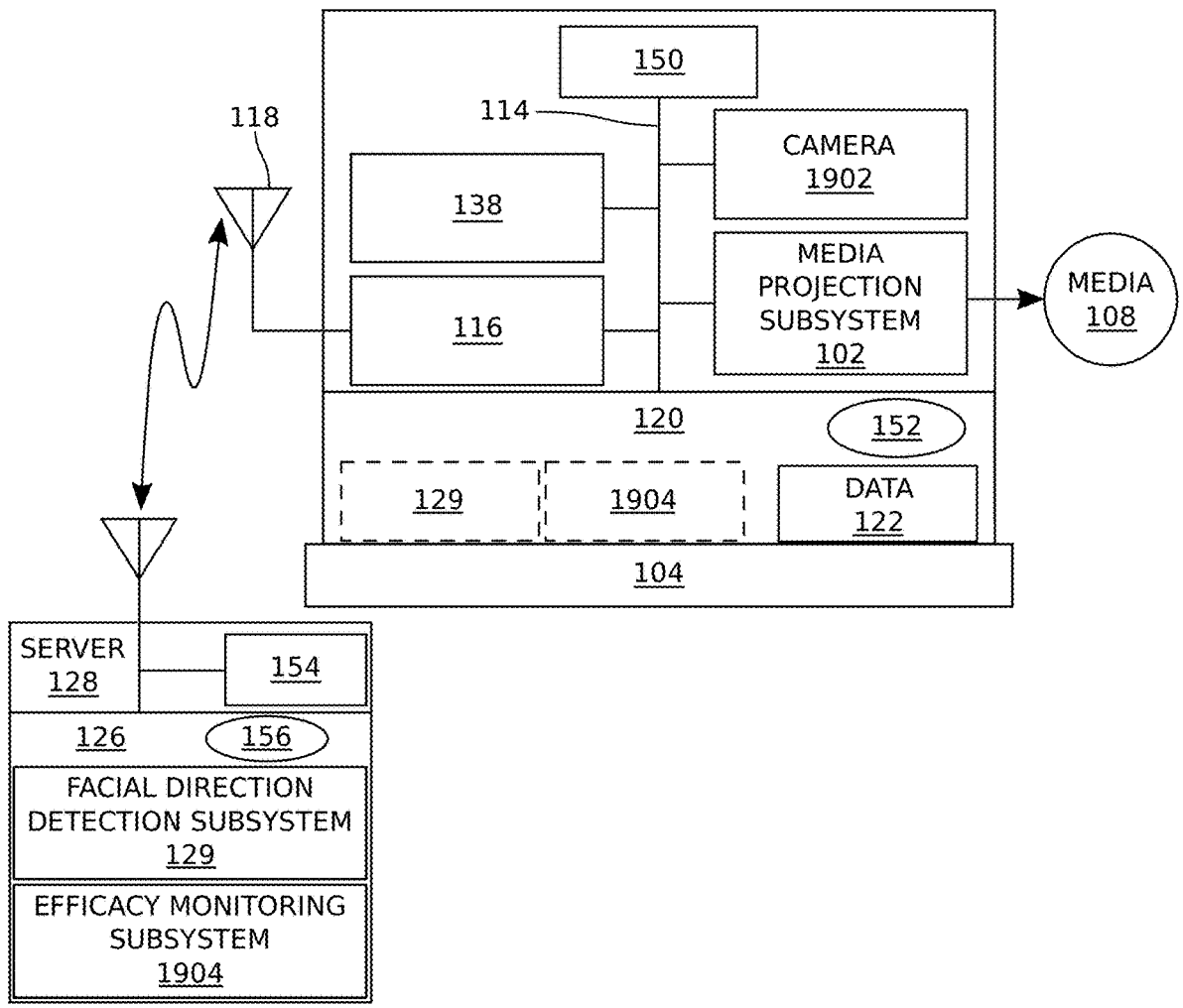
FIGS. 19A through 19C are drawings depicting a system for the measurement of display presentation efficacy.
Figure 19B:
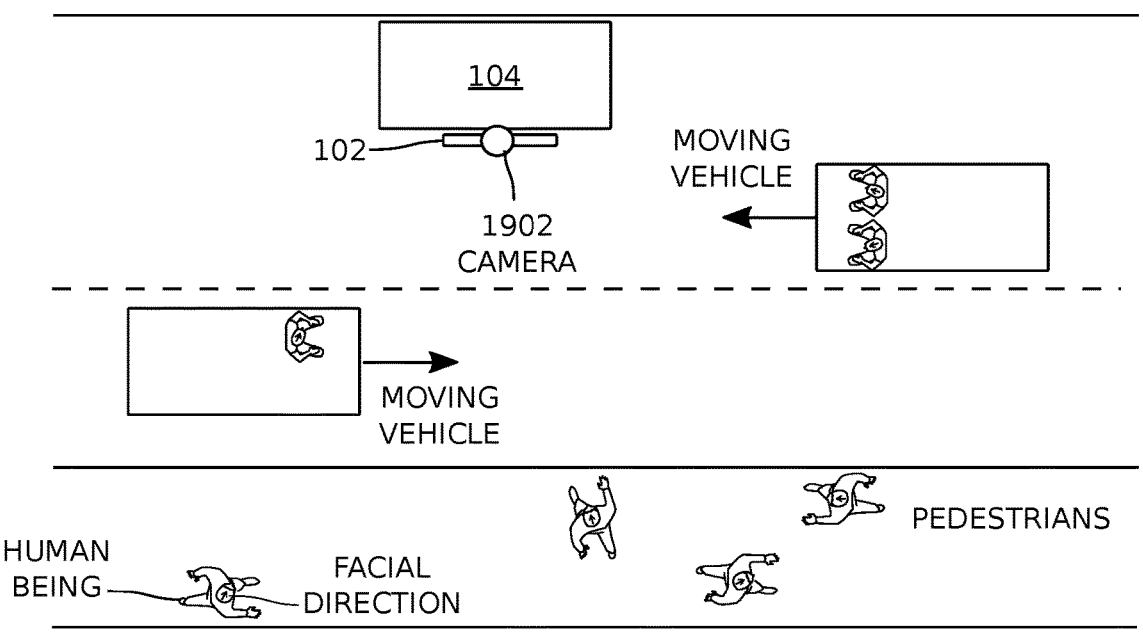
Figure 19C:
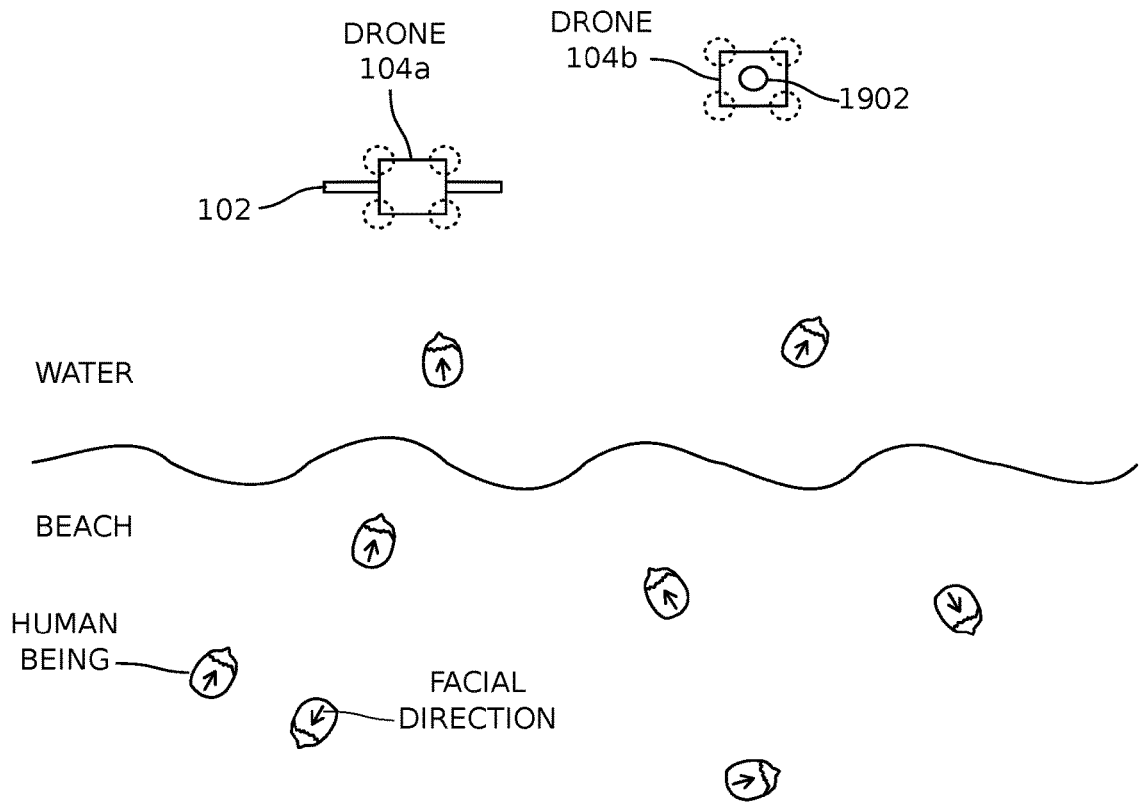

FIGS. 19A through 19C are drawings depicting a system for the measurement of display presentation efficacy. The system 1900 comprises a media projection subsystem 102, configured for attachment to a mobile platform 104. A camera 1902 records images of human beings interacting with media 108 projected by the media projection subsystem 102, and has an output on line 114 to supply the images. A facial direction detection subsystem 129 has an interface to accept images from the camera 1902, acts to recognize faces from camera images, and supplies measurement of the duration of time the faces are directed to the media projection subsystem media 108. An efficacy monitoring subsystem 1904 has an interface to accept the duration of time measurements and an interface on line 1906 to supply a determination of media effectiveness in response to the duration time measurements. In one aspect, the facial direction detection subsystem 129 and efficacy monitoring subsystem 1904 are embedded as software applications in server memory 126 due to the inherently greater storage and processing power of a server. These software applications comprise processor executable instructions to enable the above-described functions. In that case, the camera 1902 is embedded with a communications subsystem 116 to either embed the camera images as data 122 in local memory 120 for subsequent download, or wireless transmit the images directly to server 128. Alternatively, as shown in phantom, either or both the facial direction detection subsystem 129 and efficacy monitoring subsystem 1904 may be embedded as software applications in local memory 106.

Optionally, a location subsystem 138 may be used to determine the location of the media projection subsystem mobile platform 104. If the camera 1902 is not co-located with the media projection subsystem it may also include a location subsystem.

As mentioned above, facial recognition systems have become well known in the art that permit the detection of facial direction. The efficacy monitoring system can be enabled as a system that determines the number of individuals exposed to the media, the number of individual that direct their attention to the media, and the duration of time that attention is directed. These measurements may be used to compare the efficacy of one type of media to another, and/or the efficacy of one type of display to another, and/or the efficacy of a location or time.

In FIG. 19B the camera 1902 is attached to the ground-based media projection subsystem 102, or alternatively, the mobile platform 104. Human beings are shown as passengers in moving vehicles and as pedestrians.

In FIG. 19C the media projection subsystem is attached to an airborne mobile platform 104*a* over the water near a beach and the camera 1902 is attached to a separate airborne mobile platform 104*b*. Human beings are shown as beach goers and the arrows represent eye direction. The camera on either platform may also be used to help recognize hazards in the water or social disturbances on the beach, and may include a loud speaker to make public announcements.

Figure 20:
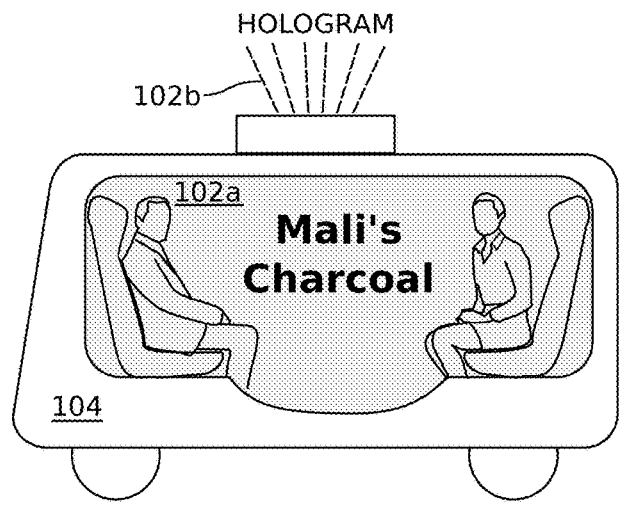
FIG. 20 is a drawing of a shared autonomous vehicle (SAV) with a media projection system enabled as a smart glass display.

FIG. 20 is a drawing of a shared autonomous vehicle (SAV) 104 with a media projection system enabled as a smart glass display 102*a*. A second holographic media projection subsystem 102*b* is enabled on the SAV 104 roof.

Systems and methods have been provided for the monitoring and support of mobile media communications. Examples of particular message structures, schematic block linkages, and hardware units have been presented to illustrate the invention. However, the invention is not limited to merely these examples. Other variations and embodiments of the invention will occur to those skilled in the art.

We claim:

1. A public exposure monitored media projection system comprising:
   a media projection subsystem, configured for attachment to a mobile platform;

a monitoring subsystem having an interface to measure public exposure to projected media and an output to supply exposure measurements;

a communications subsystem, configured for attachment to the media projection subsystem, having an interface to accept verification information including media projection subsystem enablement, selected target geographic location, and the exposure measurements;

a handicap subsystem having an output offsetting a media value associated with the enablement of the media projection subsystem, calculated in response to the exposure measurements and the selected geographic location;

a location subsystem, configured for attachment to the media projection subsystem, having an output to supply a geographic location of the media projection subsystem; and, a targeting subsystem for selecting a media projection subsystem target geographic location from a plurality of potential target geographic locations having corresponding location values.

2. The system of claim 1 further comprising:
a rewards subsystem to provide a reward to an entity in response to the media value offset by the exposure measurement.

3. The system of claim 1 further comprising:
a rewards subsystem to provide a reward to an entity in response to a combination of the offset media value and the location value.

4. The system of claim 1 wherein the communications subsystem transmits the verification information to a central controller server; and, the system further comprising:
the server configured to enable the targeting and handicap subsystems.

5. The system of claim 1 wherein the media projection subsystem is configured to enable the targeting and handicap subsystems.

6. The system of claim 1 wherein the monitoring subsystem is selected from a group consisting of a camera, sonar, LIDAR, and a photodetector ranging subsystem.

7. The system of claim 1 further comprising:
a facial direction detection subsystem having an interface to accept images from a camera, select faces from camera images, and measure the duration of time the faces are directed to the media projection subsystem.

8. The system of claim 7 wherein the camera is mounted on an airborne vehicle.

9. The system of claim 1 further comprising:
a publically accessible access point (AP), configured for attachment to the media projection subsystem, selected from the group consisting of an IEEE 803.11 Wireless Local Area Network (WLAN), an IEEE 803.15 Wireless Personal Area Network (WPAN), and both WLAN and WPAN;

a communication gauge having an output to supply a measurement of communication statistics; and, wherein the handicap subsystem modifies a communication value associated with the AP in response to the communication statistics.

10. The system of claim 9 further comprising:
a rewards subsystem to provide a reward to an entity in response to the communication value offset by the communication statistics.

11. The system of claim 1 wherein the media projection subsystem is selected from a group consisting of an image projector, a retractable screen deployed over an exterior surface of the mobile platform, a liquid crystal display, holographic display, a light emitting diode display, a media topper, popup, wallscape, electroluminescent (EL) display, switchable glass displays, persistent image fan, and combinations thereof.

12. The system of claim 1 wherein the monitoring subsystem measures an actual media projection subsystem viewing angle.

13. A public exposure monitored communications hub system comprising:
a publically accessible access point (AP), configured for attachment to a mobile platform, selected from the group consisting of an IEEE 803.11 Wireless Local Area Network (WLAN), an IEEE 803.15 Wireless Personal Area Network (WPAN), and both WLAN and WPAN;

a communications subsystem, configured for attachment to the mobile platform, having an interface to receive a selected target geographic location, and having an interface to transceiver AP communications with a central control server;

a communication gauge having an output to supply a measurement of communication statistics;

a handicap subsystem having an output to modify a communication value associated with AP enablement in response to the communication statistics, as modified in response to the selected target geographic location;

a location subsystem, configured for attachment to AP, having an output to supply a geographic location of the AP; and, a targeting subsystem for selecting an AP target geographic location from a plurality of potential target geographic locations having corresponding location values.

14. The system of claim 13 further comprising:
a rewards subsystem to provide a reward to an entity in response to the communication value offset by the communication statistics.

15. The system of claim 13 further comprising:
a rewards subsystem to provide a reward to an entity in response to a combination of the communication value and the location value.

16. The system of claim 13 further comprising:
a media projection subsystem configured for attachment to the AP.

17. A public exposure monitored media projection system comprising:
a media projection subsystem, configured for attachment to a mobile platform;

a monitoring subsystem having an interface to measure public exposure to projected media and an output to supply exposure measurements;

a communications subsystem, configured for attachment to the media projection subsystem, having an interface to accept verification information including media projection subsystem enablement, geographic location, and the exposure measurements; and, a handicap subsystem having an output offsetting a media value associated with the enablement of the media projection subsystem, calculated in response to the exposure measurements and the geographic location.

18. The system of claim 17 further comprising:
a rewards subsystem to provide a reward to an entity in response to the media value offset by the exposure measurement.

19. The system of claim 17 further comprising:

a rewards subsystem to provide a reward to an entity in response to a combination of the offset media value and the geographic location.

20. The system of claim 17 wherein the communications subsystem transmits the verification information to a central controller server; and, the system further comprising:

the server configured to enable the handicap subsystem.

21. The system of claim 17 wherein the monitoring subsystem is selected from a group consisting of a camera, sonar, LIDAR, and a photodetector ranging subsystem.

22. The system of claim 17 wherein the camera is mounted on an airborne vehicle.

23. The system of claim 17 further comprising:

a publically accessible access point (AP), configured for attachment to the media projection subsystem, selected from the group consisting of an IEEE 803.11 Wireless Local Area Network (WLAN), an IEEE 803.15 Wireless Personal Area Network (WPAN), and both WLAN and WPAN;

a communication gauge having an output to supply a measurement of communication statistics; and, wherein the handicap subsystem modifies a communication value associated with the AP in response to the communication statistics.

24. The system of claim 23 further comprising:

a rewards subsystem to provide a reward to an entity in response to the communication value offset by the communication statistics.

25. The system of claim 17 wherein the media projection subsystem is selected from a group consisting of an image projector, a retractable screen deployed over an exterior surface of the mobile platform, a liquid crystal display, holographic display, a light emitting diode display, a media topper, popup, wallscape, electroluminescent (EL) display, switchable glass displays, persistent image fan, and combinations thereof.

26. The system of claim 17 wherein the monitoring subsystem measures an actual media projection subsystem viewing angle.

* * * * *